(12) United States Patent  
Moriwaki

(10) Patent No.: US 9,448,441 B2  
(45) Date of Patent: Sep. 20, 2016

(54) LIQUID CRYSTAL DISPLAY DEVICE

(71) Applicant: Sharp Kabushiki Kaisha, Osaka-shi, Osaka (JP)

(72) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/400,560

(22) PCT Filed: Apr. 22, 2013

(86) PCT No.: PCT/JP2013/002698  
§ 371 (c)(1),  
(2) Date: Nov. 12, 2014

(87) PCT Pub. No.: WO2013/175709  
PCT Pub. Date: Nov. 28, 2013

(65) Prior Publication Data  
US 2015/0131041 A1    May 14, 2015

(30) Foreign Application Priority Data

May 25, 2012  (JP) .................................. 2012-119588

(51) Int. Cl.  
| G02F 1/1339 | (2006.01) |
| G02F 1/1337 | (2006.01) |
| G02F 1/1335 | (2006.01) |
| G02F 1/1333 | (2006.01) |
| G02F 1/1345 | (2006.01) |

(52) U.S. Cl.  
CPC ............ G02F 1/1339 (2013.01); G02F 1/1337 (2013.01); G02F 1/133305 (2013.01); G02F 1/133345 (2013.01); G02F 1/133514 (2013.01); G02F 1/133723 (2013.01); G02F 1/1345 (2013.01); G02F 2001/133388 (2013.01)

(58) Field of Classification Search  
CPC .......... G02F 1/1339; G02F 1/133514; G02F 1/133723; G02F 1/133305; G02F 1/133345; G02F 1/1337; G02F 1/1345; G02F 2001/133388  
See application file for complete search history.

(56) References Cited

U.S. PATENT DOCUMENTS

| 2007/0146598 A1* | 6/2007 | Yokokawa ............ G02F 1/1337 349/123 |
| 2007/0279565 A1 | 12/2007 | Iwato et al. |
| 2008/0137022 A1 | 6/2008 | Komeno et al. |
| 2009/0279039 A1* | 11/2009 | Kotani .............. G02F 1/133711 349/153 |

(Continued)

FOREIGN PATENT DOCUMENTS

| JP | 2007-322627 A | 12/2007 |
| JP | WO 2011058679 A1 * | 5/2011 ........ G02F 1/133711 |

(Continued)

*Primary Examiner* — Donald Raleigh  
(74) *Attorney, Agent, or Firm* — Keating & Bennett, LLP

(57) ABSTRACT

A plurality of grooves (28) are provided in a surface of the array substrate (20) facing the liquid crystal layer (50) to extend along a sealing material, and are spaced apart from each other in a width direction of the sealing material. An alignment film (27) covers surfaces of some or all of the grooves located from a midway portion of the sealing material in a width direction thereof toward a display region (D), and is in contact with the sealing material, and part of the sealing material located from the midway portion in the width direction in a direction away from the display region is directly in contact with the array substrate without the alignment film being provided between the seal material and the array substrate.

9 Claims, 16 Drawing Sheets

(56) References Cited

U.S. PATENT DOCUMENTS

2011/0199564 A1* 8/2011 Moriwaki ......... G02F 1/136227
　　　　　　　　　　　　　　　　　　　　349/122
2012/0224118 A1* 9/2012 Kanzaki .............. G02F 1/13458
　　　　　　　　　　　　　　　　　　　　349/58

2013/0027648 A1   1/2013 Moriwaki

FOREIGN PATENT DOCUMENTS

WO　　　2011058679 A1　　5/2011
WO　　　2011/129065 A1　10/2011

* cited by examiner

LIQUID CRYSTAL DISPLAY DEVICE

TECHNICAL FIELD

The present invention relates to liquid crystal display devices, in particular, a structure for controlling a region of a picture-frame region of a display panel to which an alignment film is applied.

BACKGROUND ART

Liquid crystal display devices can have a smaller thickness and lower power consumption. Therefore, the liquid crystal display devices are widely used as displays of television sets, OA equipment (e.g., personal computers), portable electronic devices (e.g., mobile phones and smart phones), and cockpits of vehicles, aircrafts, etc.

A liquid crystal display device includes a display panel and a backlight unit attached to a back surface of the display panel. The display panel includes an array substrate including switching elements (e.g., thin film transistors, etc.), a counter substrate facing the array substrate, and a sealing material bonding the array substrate and the counter substrate to each other. A liquid crystal material is enclosed in a space between the two substrates. The counter substrate is slightly smaller than the array substrate. Therefore, a terminal region of the array substrate is exposed. A drive circuit is mounted to the exposed terminal region.

The display panel includes a display region for displaying an image and a non-display region surrounding the display region.

An alignment film is provided on a surface of the array substrate contacting a liquid crystal layer to cover at least the display region. Similarly, an alignment film is provided on a surface of the counter substrate contacting the liquid crystal layer to cover at least at least the display region The alignment film may be formed by performing rubbing treatment on a surface of a resin film of polyimide, etc. formed by flexographic printing, inkjet printing, etc. To form the resin film of polyimide, etc., inkjet printing is preferably employed for the following reasons: the resin film can be drawn directly on the substrate; contamination can be reduced due to the non-contact process; the amount of solution consumed can be reduced; the time required can be reduced; etc.

Incidentally, when inkjet printing is used to form the alignment film, a resin which is a material having a lower viscosity than when flexographic printing is used is used as a material of the alignment film. Therefore, the material of the alignment film tends to leak and spread out around a region (display region) in which the alignment film should be printed. Therefore, if the non-display region around the display region is so small that a large space cannot be ensured between the display region and a sealing member region, the alignment film may be formed to reach the sealing member region. In this case, the adherence between the sealing member and the alignment film is insufficient, and therefore, the gap between the two substrates cannot be completely sealed, so that the liquid crystal material of the liquid crystal layer may leak.

In order to solve the above problem, PATENT DOCUMENT 1 describes a liquid crystal display device including a groove portion, wherein the groove portion is provided in a generally annular region which is located outside the display region and inside the region to be provided with the sealing member, and the groove portion extends long along the periphery of the display region. With this configuration, even if the liquid resin material applied by inkjet printing spreads out of the display region, the groove portion can prevent the resin material from further spreading, whereby the spread outside the display region of the alignment film can be reduced or prevented. PATENT DOCUMENT 1 further describes a configuration in which a conductive film such as an ITO film is provided on a surface of the groove portion. The liquid resin material which is a material of the alignment film has a poor wetting property with respect to the ITO film. Therefore, with this configuration, the groove portion can reduce or prevent the spread outside the display region of the alignment film.

CITATION LIST

Patent Document

PATENT DOCUMENT 1: Japanese Unexamined Patent Publication No. 2007-322627

SUMMARY OF THE INVENTION

Technical Problem

In recent years, in particular, for portable electronic devices, the width of a picture-frame region around a display region needs to be reduced in order to fulfill demands for both reducing the total size of a display device and increasing the display region.

In order to prevent the alignment film from reaching a region in which the sealing material is to be formed and from causing insufficient adhesiveness between the sealing material and the substrate, PATENT DOCUMENT 1 describes that a structure (a groove portion extending long in a direction along the periphery of the display region) to prevent the spread of the alignment film is formed so as not to overlap the sealing material region. However, when the structure to prevent the spread of the alignment film is provided so as not to overlap the seal region, the picture-frame region is increased by the structure.

It is an object of the present invention to provide a liquid crystal display device having a reduced picture-frame width without reducing the adhesiveness of a sealing material of a display panel.

Solution to the Problem

To achieve the object, an example liquid crystal display device of the present invention includes: an array substrate; a counter substrate facing the array substrate; a sealing material which is provided outside a display region and by which the array substrate is bonded to the counter substrate; a liquid crystal layer in a region surrounded by the sealing material between the array substrate and the counter substrate; and alignment films each provided on a surface of a corresponding one of the array substrate and the counter substrate facing the liquid crystal layer to cover an area including the display region. A plurality of grooves are provided in the surface of the array substrate facing the liquid crystal layer to extend along the sealing material, and are spaced apart from each other in a width direction of the sealing material, each alignment film covers surfaces of some or all of the grooves located from a midway portion of the sealing material in a width direction thereof toward the display region, and is in contact with the sealing material, and part of the sealing material located from the midway portion in the width direction in a direction away from the display region is directly in contact with the array substrate without the alignment film being provided between the seal material and the array substrate.

Preferably, in the example liquid crystal display device of the present invention, a plurality of grooves are provided in the surface of the counter substrate facing the liquid crystal layer to extend along the sealing material, and are spaced apart from each other in a width direction of the sealing material, each alignment film covers surfaces of some or all of the grooves in the array substrate and the counter substrate located from the midway portion of the sealing material in the width direction thereof toward the display region, and is in contact with the sealing material, and the part of the sealing material located from the midway portion in the width direction in a direction away from the display region is directly in contact with the array substrate and the counter substrate without the alignment films being provided between the seal material and the array substrate and between the seal material and the counter substrate.

In this configuration, the grooves are provided in a seal region of a picture-frame region of the substrate in which the sealing material is provided. Therefore, when an alignment film material is applied by inkjet printing, the grooves restrict the flow of the alignment film material to an outer part of the substrate. Thus, the alignment film spreads to the midway portion of the seal region in the width direction thereof.

Here, the alignment films are each provided on a portion of a surface of a corresponding one of the array substrate and the counter substrate located from the midway portion of the sealing region in the width direction thereof toward the display region. Thus, the adhesiveness between each substrate and the sealing material is lower than in the case where no alignment film is provided. In contrast, no alignment film is provided from the midway portion of the sealing region in the width direction thereof in a direction away from the display region. Thus, each substrate is directly in contact with the sealing material, thereby obtaining excellent adhesiveness between each substrate and the sealing material. Therefore, the array substrate is satisfactorily bonded to the counter substrate with the sealing material, and a space in which a liquid crystal layer is provided is sufficiently enclosed.

A state of adhesion between a portion of the substrate and a portion of the sealing material that are located from the midway portion of the sealing region in the width direction thereof in a direction away from the display region is closely inspected. Part of the substrate in which the grooves have been formed is bonded to the sealing material without an organic insulating material or the like interposed between the part of the substrate and the sealing material. That is, part of the sealing material corresponding to the part of the substrate in which the grooves have been formed is bonded to a component made of an inorganic material such as a transparent conductive film or metal, and the part of the sealing material and the substrate are firmly bonded together in the grooves.

Thus, in the liquid crystal display device having the above-described configuration, the plurality of grooves to restrict the flow of the alignment film material are formed in the seal region, so that the width of the picture-frame region can be reduced without reducing the adhesiveness between each substrate and the sealing material.

At least part of an insulating film included in the array substrate is preferably an organic insulating film, and the plurality of grooves are preferably formed by removing portions of the organic insulating film. The plurality of grooves are more preferably formed by removing the portions of the organic insulating film extending across a thickness of the organic insulating film. In this case, the organic insulating film is made of an acrylic resin.

With this configuration, at least the organic insulating film of the second insulating film is completely divided by the grooves into a part located inwardly from an inner edge of the seal region and a part located outwardly from an outer edge of the seal region. Therefore, even when moisture or the like contained in external air enters the organic insulating film from the side thereof remote from the display region, the moisture does not enter a portion of the second insulating film toward the display region. This reduces the risk that the adhesiveness at the interface between the alignment film and the second insulating film deteriorates due to the moisture penetration. Thus, the adhesiveness between a portion of the sealing material and a portion of each substrate that are located from the midway portion of the sealing region in the width direction thereof toward the display region can be increased even in a region in which the alignment film is provided.

In the example liquid crystal display device of the present invention, the counter substrate may include a color filter layer at least in the display region and a region provided with the sealing material, and the grooves may be formed in positions which are located in the region provided with the sealing material and from which portions of the color filter layer are removed by a partial or total thickness of the color filter layer.

The counter substrate may include an overcoat layer at least in the display region and a region provided with the sealing material, and the grooves may be formed in positions which are located in the region provided with the sealing material and from which portions of the overcoat layer are removed by a partial or total thickness of the overcoat layer.

In the example liquid crystal display device of the present invention, in a region of the array substrate in which a first interconnect, a first insulating film, a second interconnect, and a second insulating film are sequentially stacked and the grooves overlap the first interconnect when viewed in plan, a stopper layer formed in a layer identical with the second interconnect is preferably provided between the first insulating film and the second insulating film.

With this configuration, each of the first interconnects is not exposed at the surfaces of the grooves in forming the grooves, so that the risk that a leak occurs between adjacent ones of the first interconnects by a substance such as conductive dust on surfaces of the grooves does not arise. Therefore, even when the grooves cross over the first interconnect, short circuits or the like between the adjacent ones of the first interconnects can be reduced.

In this case, a transparent conductive film is preferably provided on surfaces of the grooves to cover at least the stopper layer.

With this configuration, the stopper layer is not exposed at the surfaces of the grooves, so that deterioration of the stopper layer due to corrosion can be reduced.

In the example liquid crystal display device of the present invention, the grooves including preferably two to twenty grooves are arranged in parallel.

Advantages of the Invention

According to the present invention, the width of a picture frame of a liquid crystal display device can be reduced without reducing the adhesiveness of a sealing material of a display panel of the liquid crystal display device.

DESCRIPTION OF EMBODIMENTS

Embodiments of the present invention will be described in detail below based on the drawings.

First Embodiment

Liquid Crystal Display Device

Figure 1:
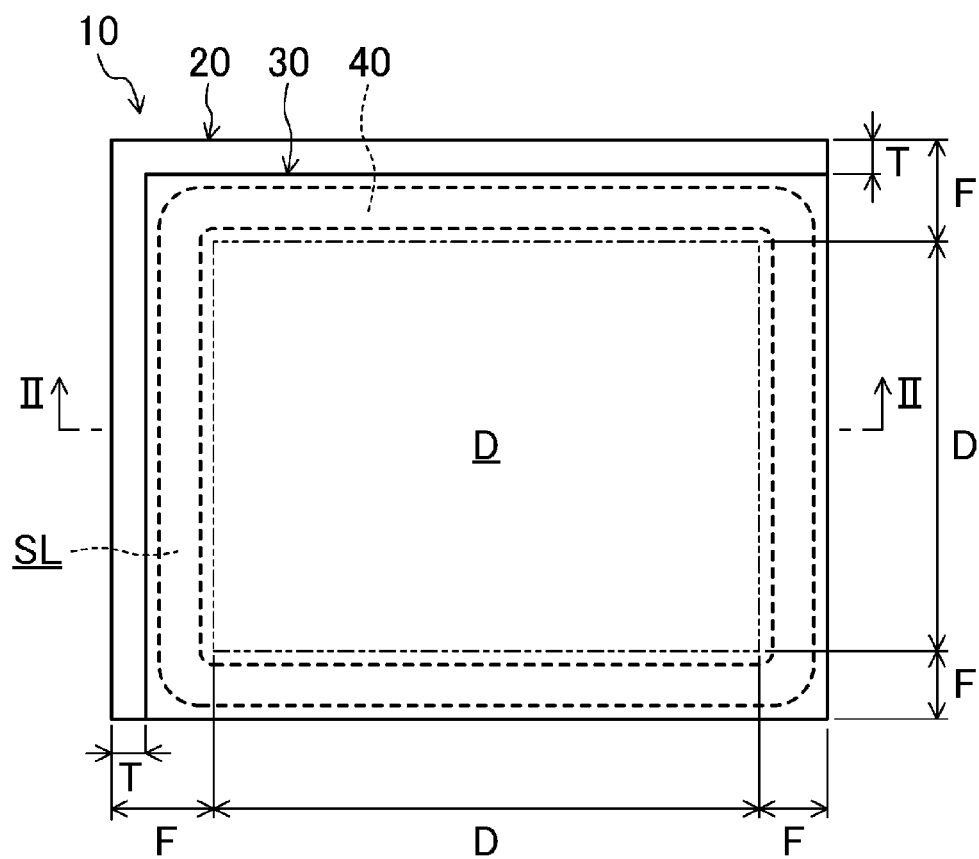
FIG. 1 is a plan view illustrating a liquid crystal display device according to a first embodiment.
Figure 2:
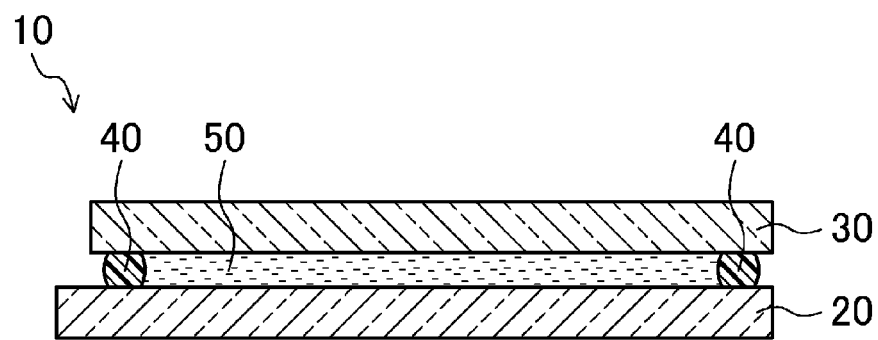
FIG. 2 is a cross-sectional view taken along the line II-II of FIG. 1.
Figure 3:
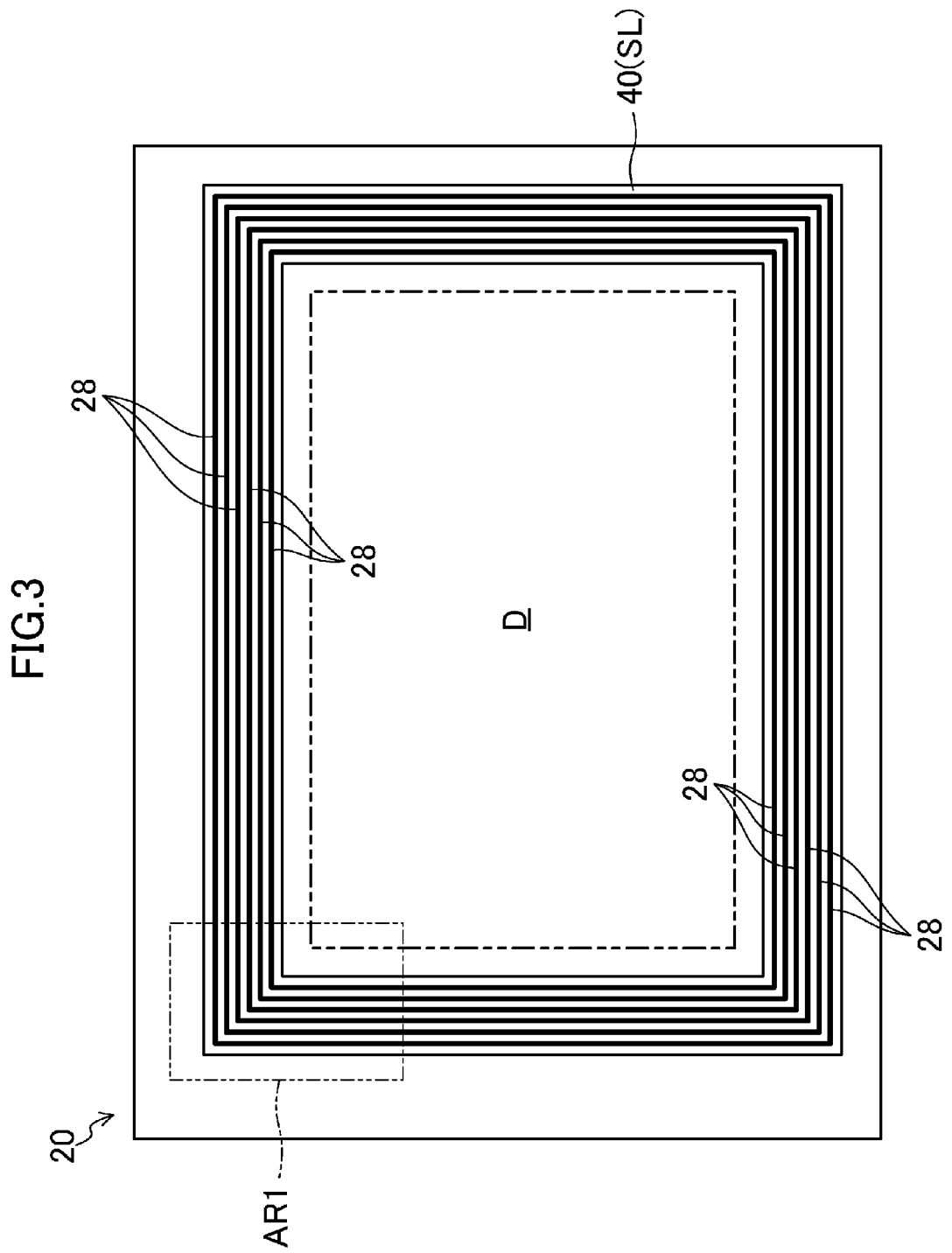
FIG. 3 is a plan view schematically illustrating an array substrate according to the first embodiment.
Figure 4:
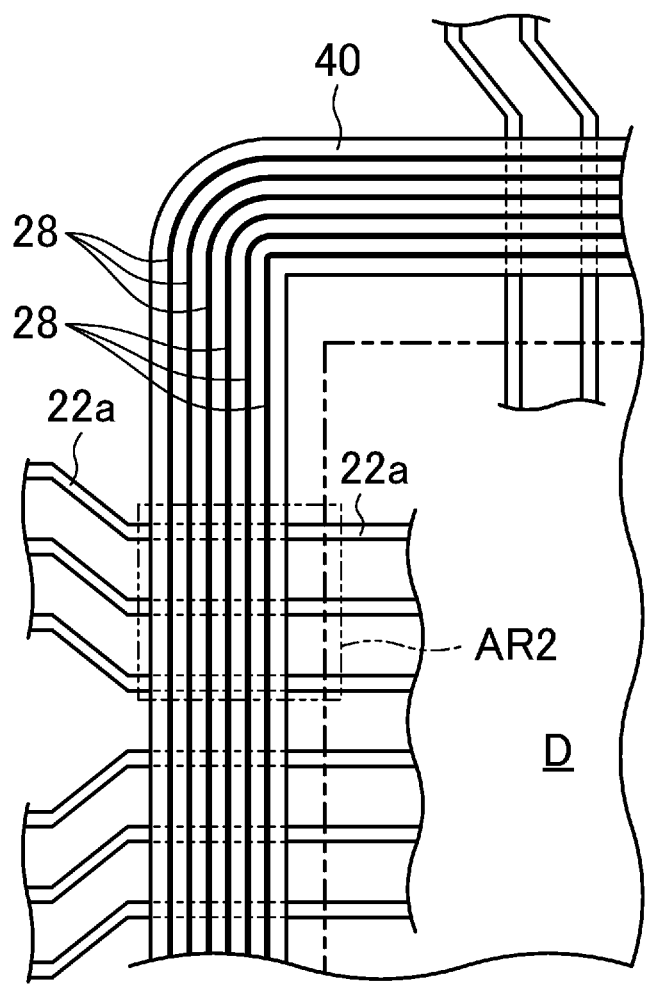
FIG. 4 is an enlarged plan view illustrating the region AR1 of FIG. 3.
Figure 5:
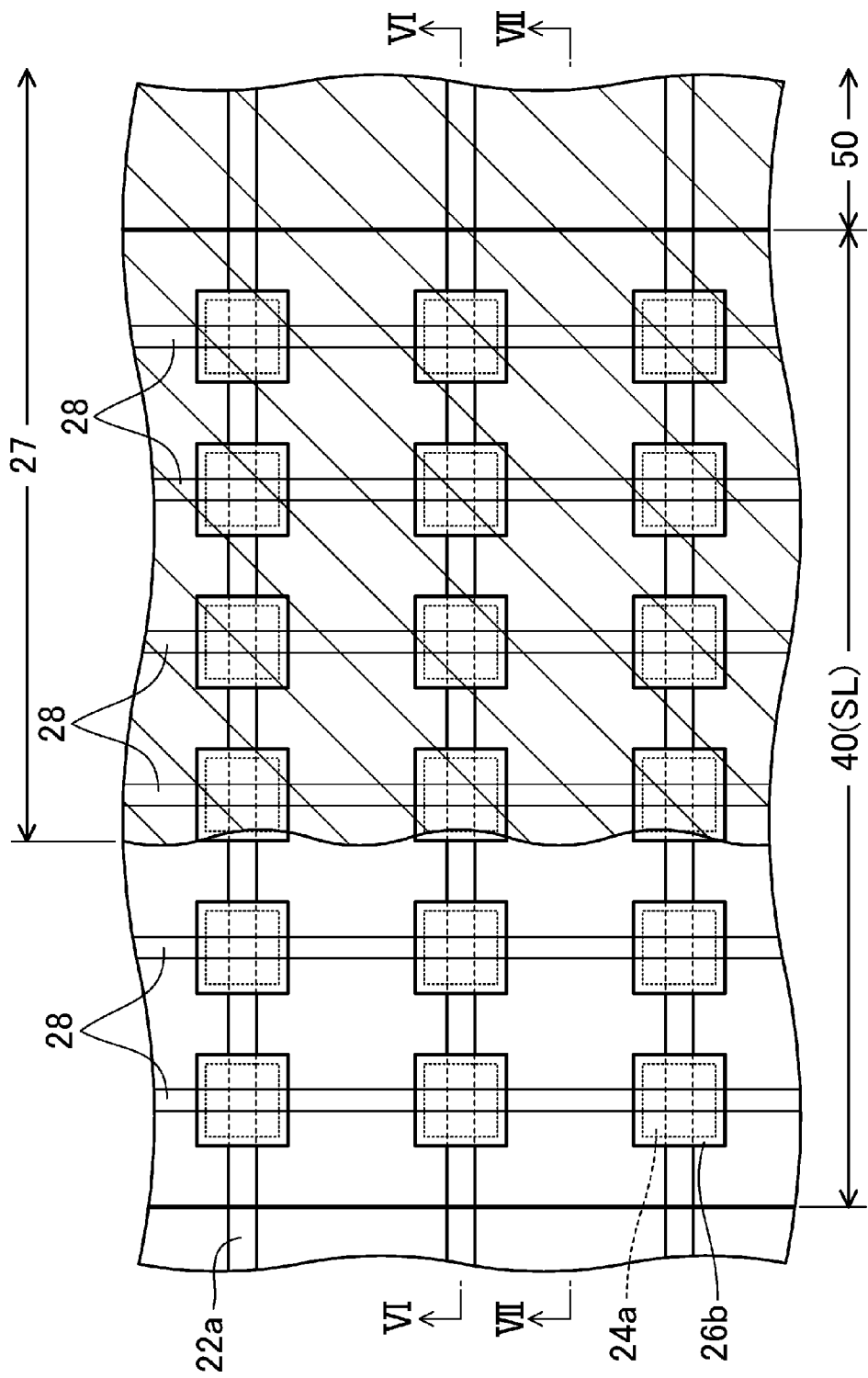
FIG. 5 is an enlarged plan view illustrating the region AR2 of FIG. 4.
Figure 6:
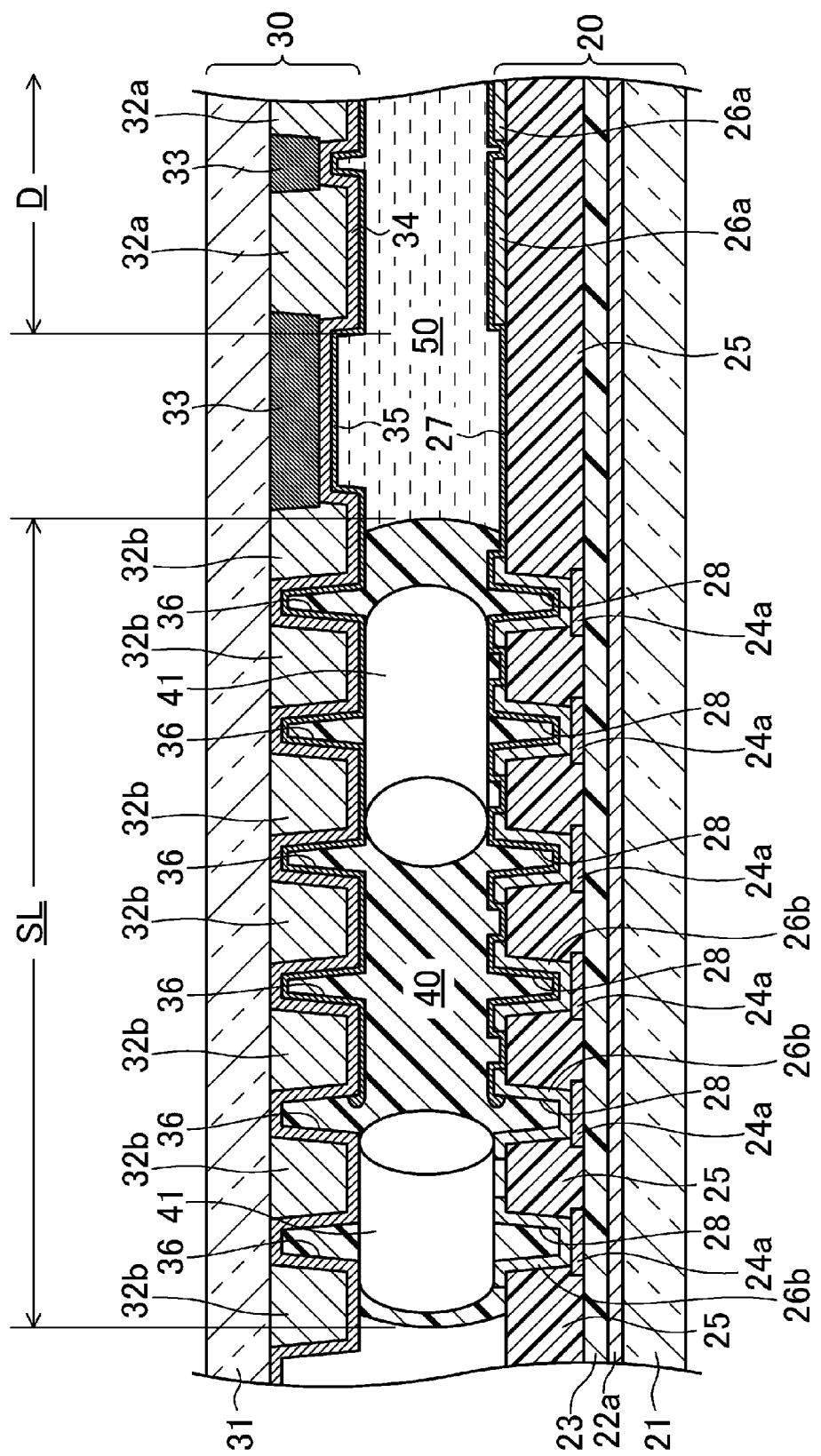
FIG. 6 is a cross-sectional view taken along the line VI-VI of FIG. 5.
Figure 7:
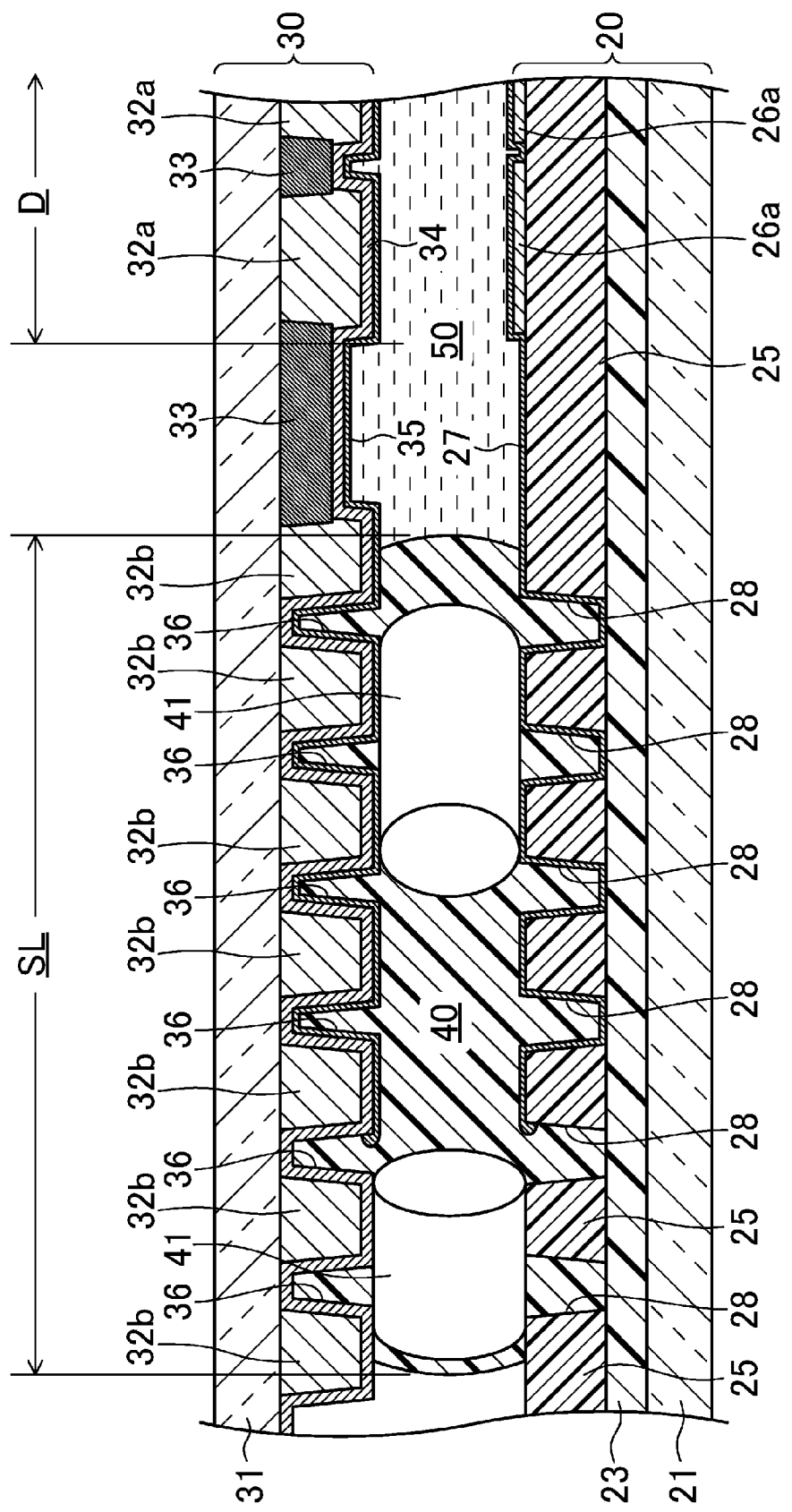
FIG. 7 is a cross-sectional view taken along the line VII-VII of FIG. 5.

FIGS. 1 and 2 are views schematically illustrating an entire liquid crystal display device 10 according to the present embodiment. FIG. 3 is a plan view schematically illustrating an array substrate 20. FIG. 4 is an enlarged view illustrating a region AR1 of FIG. 3. FIG. 5 is an enlarged view illustrating a region AR2 of FIG. 4. FIG. 6 is a cross-sectional view illustrating the liquid crystal display device, inclusive of a cross section taken along the line VI-VI of FIG. 5. FIG. 7 is a cross-sectional view illustrating the liquid crystal display device, inclusive of a cross section taken along the line VII-VII of FIG. 5.

As illustrated in FIGS. 1 and 2, for the liquid crystal display device 10, a frame-like picture-frame region F is defined in a substrate peripheral section, and a region surrounded by the picture-frame region F is a display region D. The liquid crystal display device 10 includes the array substrate 20 and a counter substrate 30 which face each other. The array substrate 20 and the counter substrate 30 are bonded to each other at an outer peripheral part with an annular sealing material 40 disposed as a frame-like seal region SL. A liquid crystal layer 50 is provided in a space surrounded by the sealing material 40 between the substrates 20 and 30, thereby forming the display region D. Part of the array substrate 20 in the picture-frame region F around the display region D protrudes beyond the counter substrate 30 and serves as a terminal region T to which an external connection terminal such as a mount device will be mounted.

(Array Substrate)

When the array substrate 20 is provided with bottom-gate thin film transistors, the array substrate 20 is formed by stacking a first conductive film (first interconnect) including gate signal lines (not shown), a gate insulating film 23 (first insulating film), a second conductive film (second interconnect) including source signal lines (not shown), an interlayer insulating film 25 (second insulating film), and a third conductive film including pixel electrodes 26a on a substrate body 21 (see FIG. 6). The first conductive film and the second conductive film each include, for example, a titanium (Ti) film and a copper (Cu) film stacked on the Ti film. The gate insulating film 23 (first insulating film) is, for example, a silicon nitride (SiNx) film. The interlayer insulating film 25 (second insulating film) includes, for example, an inorganic insulating film (e.g., a silicon nitride (SiNx) film) as a passivation film and an organic insulating film (e.g., an acrylic resin film) stacked on the inorganic insulating film. When the thin film transistors are top gate transistors, the gate insulating film 23 is formed before the first conductive film is formed, and an insulating film covering the first conductive film is formed as the first insulating film.

Specifically, in the display region D of the array substrate 20, the plurality of gate signal lines are parallel to each other, the plurality of source signal lines are parallel to each other, and the gate signal lines are orthogonal to the source signal lines. A region surrounded by an adjacent pair of the gate signal lines and an adjacent pair of the source signal lines forms a single pixel. Each thin film transistor is provided for a corresponding one of the pixels. Each pixel electrode 26a corresponds to an associated one of the thin film transistors. The interlayer insulating film 25 covers the entire surface of the substrate, inclusive of the picture-frame region F. In the picture-frame region F of the array substrate 20, the source signal lines and the gate signal lines are lead out via lead lines (e.g., interconnects 22a in FIGS. 6 and 7) to the terminal region T. The gate signal lines are connected to gate drivers (not shown), and the source signal lines are connected to source drivers (not shown).

On a surface of the array substrate 20 facing the liquid crystal layer 50, an alignment film 27 is provided to cover an area including the display region D. As illustrated in FIG. 5, the alignment film 27 extends outwardly from the display region D to a midway portion of the seal region SL in a width direction thereof. The alignment film 27 is made of, for example, a polyimide resin, etc.

As illustrated in FIGS. 3 and 4, a plurality of grooves 28 are provided in the seal region SL of the array substrate 20 to have an annular shape surrounding the display region D. The grooves 28 are spaced apart from each other in a width direction of the sealing material 40 and extend along the sealing material 40. Two to twenty grooves 28 are preferably provided (six grooves in FIGS. 3-7). As illustrated in FIGS. 6 and 7, the grooves 28 are provided at positions from which the interlayer insulating film 25 has been removed. Each groove 28 has a width of 2-50 μm, more preferably 4-20 μm. The grooves 28 are aligned at a pitch of, for example, 4-100 μm.

As illustrated in FIGS. 5 and 6, island-like stopper layers 24*a* are provided in regions which will be bottom surfaces of the grooves 28, and the regions correspond to positions at which the grooves 28 cross over the interconnects 22*a*. The stopper layers 24*a* are formed from the second conductive film at the same time as the source signal lines are formed. Since the stopper layers 24*a* are provided, the interconnects 22*a* located at the bottom surfaces of the grooves 28 are not exposed in surfaces of the grooves 28. This also eliminates or reduces the risk that a leak is caused between the adjacent interconnects 22*a* by a substance such as conducive dust on the surfaces of the grooves 28. Therefore, even when the grooves 28 cross over the interconnects 22*a* or the like made from the first conductive film, problems such as a short circuit between the interconnects 22*a* do not arise.

Some of the stopper layers 24*a* may be connected to a transfer pad (not shown) configured to apply a common electric potential to a common electrode 34 which will be described later. In this case, while the stopper layers 24*a* may be electrically continuous with the common electrode 34 via, for example, conductive beads (not shown), the stopper layers 24*a* and the common electrode 34 are then simply kept at the common electric potential, and problems such as a display defect caused by the leak of a current do not arise. The other stopper layers 24*a* which are not connected to the transfer pad are in a floating state. Even when the stopper layers 24*a* in the floating state are electrically continuous with the common electrode 34, problems such as a display defect caused by the leak of a current do not arise.

At the positions at which the grooves 28 cross over the interconnects 22*a*, island-like transparent conductive films 26*b* are further provided so that the surfaces of the grooves 28 are covered with the transparent conductive film 26*b*. With this configuration, the stopper layers 24*a* provided at the bottom surfaces of the grooves 28 are not exposed at the surfaces of the grooves 28, so that deterioration of the stopper layers 24*a* due to corrosion is reduced. The transparent conductive films 26*b* are formed from the third conductive film at the same time as the pixel electrodes 26*a* are formed. The transparent conductive films 26*b* are not essential elements.

(Counter Substrate)

The counter substrate 30 includes color filter layers 32*a*, a black matrix 33, and the common electrode 34 which are stacked on a substrate body 31. In the picture-frame region F in the outer peripheral part of the substrate, the black matrix 33 forms a light-shielding region (not shown). Specifically, in the display region D of the counter substrate 30, each of the color filter layers 32*a* corresponds to an associated one of the pixels and is colored with, for example, red, green, or blue depending on the display color. The black matrix 33 is provided in the light-shielding region defining the color filter layers 32*a*. The common electrode 34 covers the entire surface of the substrate, inclusive of the picture-frame region F. The common electrode 34 is kept at a common electric potential via, for example, a conductive bead (not shown) mixed in the sealing material 40. The common electric potential is applied via a transfer pad (not shown) provided in the picture-frame region F of the array substrate 20. In the picture-frame region F of the counter substrate 30, color filter layers 32*b* are made of a resin which is the same as a material forming the color filter layers 32*a*. The color filter layers 32*b* correspond to at least the seal region SL of the picture-frame region F.

On a surface of the counter substrate 30 facing the liquid crystal layer 50, an alignment film 35 is provided to cover an area including the display region D. The alignment film 35 extends outwardly from the display region D to the midway portion of the seal region SL in the width direction thereof. The alignment film 35 is made of, for example, a polyimide resin, etc.

Similarly to the array substrate 20, a plurality of annular grooves 36 are provided in the seal region SL of the counter substrate 30 to surround the display region D (see FIGS. 6 and 7). The grooves 36 are spaced apart from each other in the width direction of the sealing material 40 and extend along the sealing material 40. Two to twenty grooves 36 are preferably provided (six grooves in FIG. 6). As illustrated in FIGS. 6 and 7, the grooves 36 are provided at positions from which the color filter layers 32*b* formed in a layer identical with the color filter layers 32*a* have been removed. Each groove 36 has a width of 2-50 μm, more preferably 4-20 μm. The grooves 36 are aligned at a pitch of, for example, 4-100 μm.

The array substrate 20 has the annular grooves 28 surrounding the display region D, and the counter substrate 30 has the annular grooves 36 surrounding the display region D. This reduces the flow of a liquid material of the alignment film from the display region D toward the picture-frame region F in forming the alignment films 27, 35. Thus, the area where the alignment film material spreads out can be reduced.

As described above, the sealing material 40 is provided in an annular form outside the display region D and bonds the array substrate 20 to the counter substrate 30. As illustrated in FIGS. 6 and 7, surfaces of some of the grooves 28 (four of the six grooves 28 in FIGS. 6 and 7) are covered with the alignment film 27, and surfaces of some of the grooves 36 (four of the six grooves 36 in FIGS. 6 and 7) are covered with the alignment film 35. Part of the sealing material 40 located from the midway portion in the width direction toward the display region D fills the grooves 28, 36 having surfaces respectively covered with the alignment films 27, 35 and is in contact with the alignment films 27, 35. On the other hand, part of the sealing material 40 located from the midway portion in the width direction in a direction away from the display region D (a direction opposite to the display region) is directly in contact with the interlayer insulating film 25 and the transparent conductive film 26*b* of the array substrate 20, and is directly in contact with the common electrode 34 of the counter substrate 30 because no alignment films 27, 35 are provided.

Glass fiber ground products 41 serving as spacers to keep a uniform distance between the array substrate 20 and the counter substrate 30 are mixed in the sealing material 40. The glass fiber ground products 41 have, for example, a fiber diameter of about 4-8 μm and a length of about 10-100 μm. The glass fiber ground products 41 whose fiber diameter and length are larger than the widths of the grooves 28 and 36 are preferably used, so that the glass fiber ground products 41 do not fall in the grooves 28 or the grooves 36. When the fibers cannot have a larger diameter than the widths of the grooves, it is sufficient if the length of the fibers is larger than the widths of the grooves. The glass fiber ground products 41 are sandwiched between a surface of the interlayer insulating film 25 and a surface of the color filter layers 32*b*, thereby keeping the distance between the array substrate 20 and the counter substrate 30 uniform.

The liquid crystal layer 50 is made of, for example, nematic liquid crystals.

When a TFT in each pixel of the liquid crystal display device 10 having the above-described configuration is turned on, a potential difference occurs between the pixel electrode 26a and the common electrode 34, so that a predetermined voltage is applied to a liquid crystal capacitor made of the liquid crystal layer 50. The alignment of liquid crystal molecules of the liquid crystal display device 10 varies depending on the applied voltage. The liquid crystal display device 10 uses the variation in the alignment to adjust the transmittance of incident light from outside, thereby displaying a desired image.

(Method for Fabricating Liquid Crystal Display Device)

Next, a method for fabricating a liquid crystal display device having the above-described configuration will be described.

First, a first conductive film including gate signal lines and interconnects 22a, a gate insulating film 23, and a second conductive film including source signal lines and stopper layers 24a are sequentially stacked on a substrate body 21 by using a known method.

Next, for example, a silicon nitride (SiNx) film is formed as an inorganic insulating film to cover the entire surface of the substrate, and an acrylic resin film is further formed as an organic insulating film, thereby forming an interlayer insulating film 25. Then, the acrylic resin film as the organic insulating film, which is photosensitive, is exposed to light and is then developed to remove portions of the acrylic resin film corresponding to grooves 28. Further, the silicon nitride (SiNx) film is dry etched using the acrylic resin film as a mask, thereby removing portions of the silicon nitride film corresponding to the grooves 28. In this way, the grooves 28 are formed. Alternatively, when the organic insulating film is made of a non-photosensitive acrylic resin, a resist is applied to the organic insulating film and is then developed, and the organic and inorganic insulating films are further etched separately or at the same time to remove portions of the interlayer insulating film 25, thereby forming the grooves 28. At this time, the stopper layers 24a or the substrate body 21 is fully exposed at surfaces of the grooves 28 formed by removing the portions of the interlayer insulating film 25.

Next, a third conductive film including pixel electrodes 26a and transparent conductive films 26b and made of a transparent conductive material such as ITO or IZO is stacked.

Moreover, an alignment film 27 is formed by inkjet printing to cover the display region D. At this time, liquid polyimide which is an alignment film material flows to and spreads over the picture-frame region F. However, the grooves 28 restrict the spread of the polyimide. Therefore, no polyimide film is formed in some of the grooves 28 in positions located outwardly from the midway portion of the seal region SL On the other hand, color filter layers 32a, 32b and a black matrix 33 are formed on a substrate body 31 by a known method and are developed after exposure of the color filter layer 32b to light to remove portions of the color filter layer 32b, thereby forming the grooves 36. When the color filter layer 32b is not photosensitive, a resist is applied to the color filter layer 32b and is then developed. The color filter layer 32b is further etched to remove portions thereof, thereby forming the grooves 36. A common electrode 34 is stacked to cover the color filter layers 32a, 32b and the black matrix 33. In a manner similar to the alignment film 27 of the array substrate 20, an alignment film 35 is stacked. At this time, liquid polyimide which is an alignment film material flows to and spreads over the picture-frame region F. However, the grooves 36 restrict the spread of the polyimide. Therefore, no polyimide film is formed in some of the grooves 36 located outwardly from the midway portion of the seal region SL.

Subsequently, a sealing material 40 is applied to a surface of the fabricated array substrate 20 or the fabricated counter substrate 30, and a liquid crystal material is dropped on a region surrounded by the sealing material 40. Then, the two substrates are placed one over another, and the sealing material 40 is hardened, thereby bonding the substrates 20, 30 to each other. Thus, a display panel is fabricated.

In addition to the above-described processes, a vacuum injection process using a capillary phenomenon may be performed to inject the liquid crystal material into a space between the two substrates 20, 30. In this case, specifically, the sealing material 40 is applied in a frame-like shape having an opening which will be an inlet of the liquid crystal material. Then, the substrates 20, 30 are bonded to each other, and the sealing material 40 is hardened. The substrates are divided into cells, and then the liquid crystal material is injected through the opening in the sealing material 40 under a vacuum environment. Finally, the inlet is sealed with an end-sealing material.

Finally, the substrates are divided into cells. Then, a polarizer is stuck to the liquid crystal display panel, parts are mounted, and modularization processes, etc. (e.g., assembly of the backlight) are performed. In this way, the liquid crystal display device 10 is fabricated.

Advantages of First Embodiment

In the liquid crystal display device 10 having the configuration of the present embodiment, the grooves 28 and the grooves 36 are respectively provided in the array substrate 20 and the counter substrate 30 in the seal region SL of the picture-frame region F. Therefore, when an alignment film material is applied by inkjet printing, the grooves restrict the spread of the alignment film material to the outer portion of the substrates, so that the alignment films 27, 35 spread to the midway portion of the seal region SL in the width direction thereof (see the hatched region in FIG. 5).

Here, the alignment films 27 and 35 are provided on a portion of the surface of a corresponding one of the array substrate 20 and the counter substrate 30 located inwardly from the midway portion of the seal region SL in the width direction. Therefore, the adhesiveness between the substrates and the sealing material 40 is lower than in the case where no alignment film is provided. However, no alignment films 27, 35 are formed outwardly from the midway portion of the seal region SL in the width direction. Therefore, excellent adhesiveness can be obtained between each of the substrates and the sealing material 40. Therefore, the array substrate 20 and the counter substrate 30 are satisfactorily bonded to each other with the sealing material 40, and the space in which the liquid crystal layer 50 is provided is sufficiently enclosed with the sealing material 40.

The adhesion of a portion of the array substrate 20 and a portion of the sealing material 40 that are located outwardly from the midway portion of the seal region SL in the width direction thereof is inspected. In this case, in part of the array substrate 20 in which the grooves 28 have been formed, the transparent conductive films 26b (see FIG. 6) or the substrate body 21 (see FIG. 7) is bonded to the sealing material 40. That is, regions of the sealing material 40 corresponding to the grooves 28 are bonded to an element made of an inorganic material and are firmly bonded to the array substrate 20.

The adhesion of a portion of the counter substrate 30 and a portion of the sealing material 40 that are located outwardly from the midway portion of the seal region SL in the width direction thereof is inspected. In this case, in parts of the counter substrate 30 in which the grooves 36 have been formed, the common electrode 34 (see FIG. 6) is bonded to the sealing material 40. That is, regions of the sealing material 40 corresponding to the grooves 36 are bonded to an element made of an inorganic material and are firmly bonded to the counter substrate 30.

In the liquid crystal display device 10 of the present embodiment, the plurality of grooves 28, 36 to restrict the spread of the alignment film material are provided in the seal region SL. Thus, the width of the picture-frame region F can be reduced without reducing the adhesiveness to the substrates.

In the liquid crystal display device 10 of the present embodiment, the stopper layers 24a are provided at the bottom surfaces of the grooves 28 in the array substrate 20. Therefore, the interlayer insulating film 25 made of an organic insulating material is completely removed from the bottom surfaces of the grooves 28. That is, part of the interlayer insulating film 25 located outwardly from the seal region SL is completely separated from part of the interlayer insulating film 25 located inwardly from the seal region SL by the annular grooves 28. Therefore, even in the case of entrance of moisture or the like into the part of the interlayer insulating film 25 located outwardly from the seal region SL and exposed to external air, the moisture does not permeate the part of the interlayer insulating film 25 located inwardly from the seal region SL. This eliminates or reduces the risk that the permeation of the moisture reduces the adhesiveness at the interface between the alignment film and the interlayer insulating film 25.

Second Embodiment

Next, a liquid crystal display device 10 of a second embodiment will be described. In the present embodiment, configurations identical with or corresponding to the configurations of the first embodiment are labeled with the same reference characters as shown in the first embodiment for description.

Similarly to the first embodiment, the liquid crystal display device 10 includes an array substrate 20 and a counter substrate 30 which face each other and are bonded to each other with a sealing material 40 disposed at their outer peripheral parts, wherein a liquid crystal layer 50 is provided as a display layer in a space surrounded by the sealing material 40. Unlike the first embodiment, the liquid crystal display device 10 of the second embodiment is configured as an in plane switching (IPS) liquid crystal display. That is, the second embodiment is different from the first embodiment in that a common electrode is provided on the array substrate 20, but not on the counter substrate 30, and that pixel electrodes 26a are provided in a comb teeth-pattern when viewed in plan.

Figure 8:
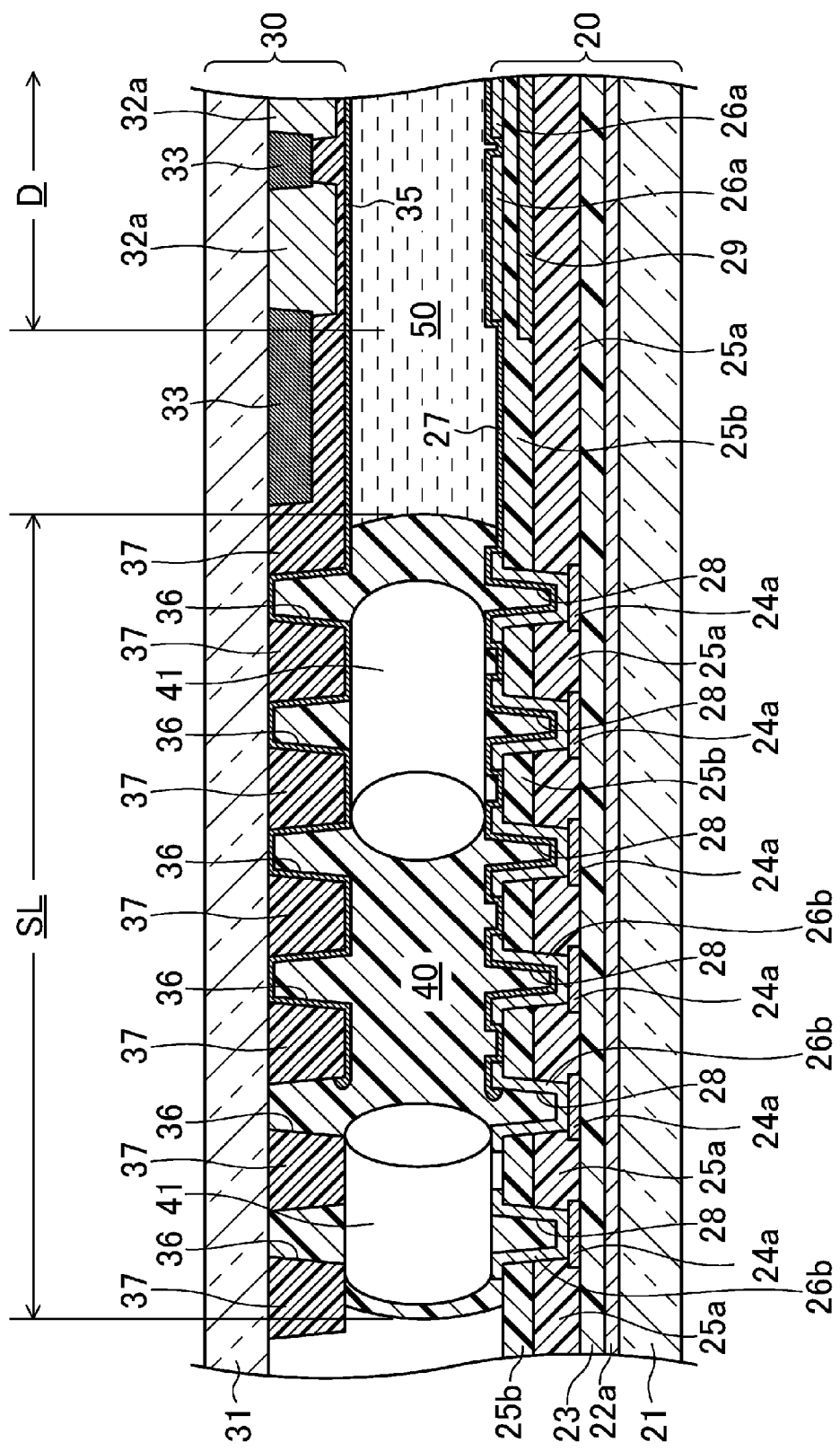
FIG. 8 is a cross-sectional view illustrating a liquid crystal display device according to a second embodiment.

As illustrated in FIG. 8, the array substrate 20 includes a first conductive film including gate signal lines (not shown), a gate insulating film 23, a second conductive film including source signal lines (not shown), a first interlayer insulating film 25a, a first transparent electrode provided as a common electrode 29, a second interlayer insulating film 25b, a second transparent electrode including the pixel electrodes 26a, and an alignment film 27 which are stacked on a substrate body 21. The first interlayer insulating film 25a is made of an inorganic insulating material such as silicon nitride (SiNx). The second interlayer insulating film 25b is made of an organic insulating material such as an acrylic resin.

Grooves 28 are provided in positions from which portions of the first and second interlayer insulating films 25a, 25b have been removed. Similarly to the first embodiment, stopper layers 24a under the first interlayer insulating film 25a are exposed at bottoms of the grooves 28. Transparent conductive films 26b cover surfaces of the grooves 28, inclusive of the stopper layers 24a. When the second interlayer insulating film 25b is made of a photosensitive acrylic resin, the photosensitive acrylic resin is exposed to light, and then, the second interlayer insulating film 25b is developed. The first interlayer insulating film 25a (silicon nitride film) is dry etched using the acrylic resin as a mask to remove portions of the first interlayer insulating film 25a, thereby forming the grooves 28. Alternatively, when the second interlayer insulating film 25b is made of a non-photosensitive acrylic resin, a resist is applied to the second interlayer insulating film 25b and is then developed, and the second interlayer insulating film 25b is etched to remove portions of the second interlayer insulating film 25b. A resist is further applied to the first interlayer insulating film 25a and is then developed, and the first interlayer insulating film 25a is etched to remove portions of the first interlayer insulating film 25a, thereby forming the grooves 28. The first interlayer insulating film 25a and the second insulating film 25b may be simultaneously developed and etched to form the grooves 28. Alternatively, after the first interlayer insulating film 25a (silicon nitride film) is formed and before the second interlayer insulating film 25b is formed, portions of the first interlayer insulating film 25a corresponding to the grooves 28 may be removed by etching, and the first transparent electrode including the common electrode 29 and the second interlayer insulating film 25b (photosensitive acrylic resin) may be formed and developed to remove the portions of the second interlayer insulating film 25b corresponding to the grooves 28, thereby forming the grooves 28.

The counter substrate 30 includes color filter layers 32a, a black matrix 33, an overcoat layer 37, and an alignment film 35 which are stacked on a substrate body 31. Specifically, the overcoat layer 37 is made of, for example, a transparent acrylic resin and is provided on the entire surface of the substrate to cover the color filter layers 32a and the black matrix 33.

Grooves 36 are provided in regions from which portions of the overcoat layer 37 provided in the picture-frame region F have been removed. The grooves 36 are formed by developing the overcoat layer 37 after exposure of the overcoat layer 37 to light. Alternatively, when the overcoat layer 37 is non-photosensitive, the grooves 36 are formed in a manner such that a resist is applied to the overcoat layer 37 and is then developed, and the overcoat layer 37 is further etched to remove the portions of the overcoat layer 37.

Other configurations are based on the configuration of a display similar to that of the first embodiment or a generally known IPS liquid crystal display.

In the liquid crystal display device 10 having the above-described configuration, a predetermined voltage is applied on a pixel-by-pixel basis to the liquid crystal layer 50 between each of the pixel electrodes 26a on the array substrate 20 and the common electrode 29 to induce an electric field in a lateral direction, thereby varying the alignment of the liquid crystal layer 50. In this way, the transmittance of light transmitted through the display panel is adjusted, so that a desired image is displayed.

The liquid crystal display device 10 having the above-described configuration can be fabricated by the fabrication method of the first embodiment based on a production method of a conventional IPS liquid crystal display device.

The liquid crystal display device 10 having the above-described configuration includes no common electrode on the counter substrate 30, so that a surface of the substrate body 31 is exposed in a region in which the alignment film 35 is not provided. Therefore, a sealing material 40 is directly bonded to the substrate body 31, which is a glass substrate. Thus, an increased adhesiveness can be obtained between the counter substrate 30 and the sealing material 40.

Other configurations and advantages are similar to those described in the first embodiment.

(First Variation)

Figure 9:
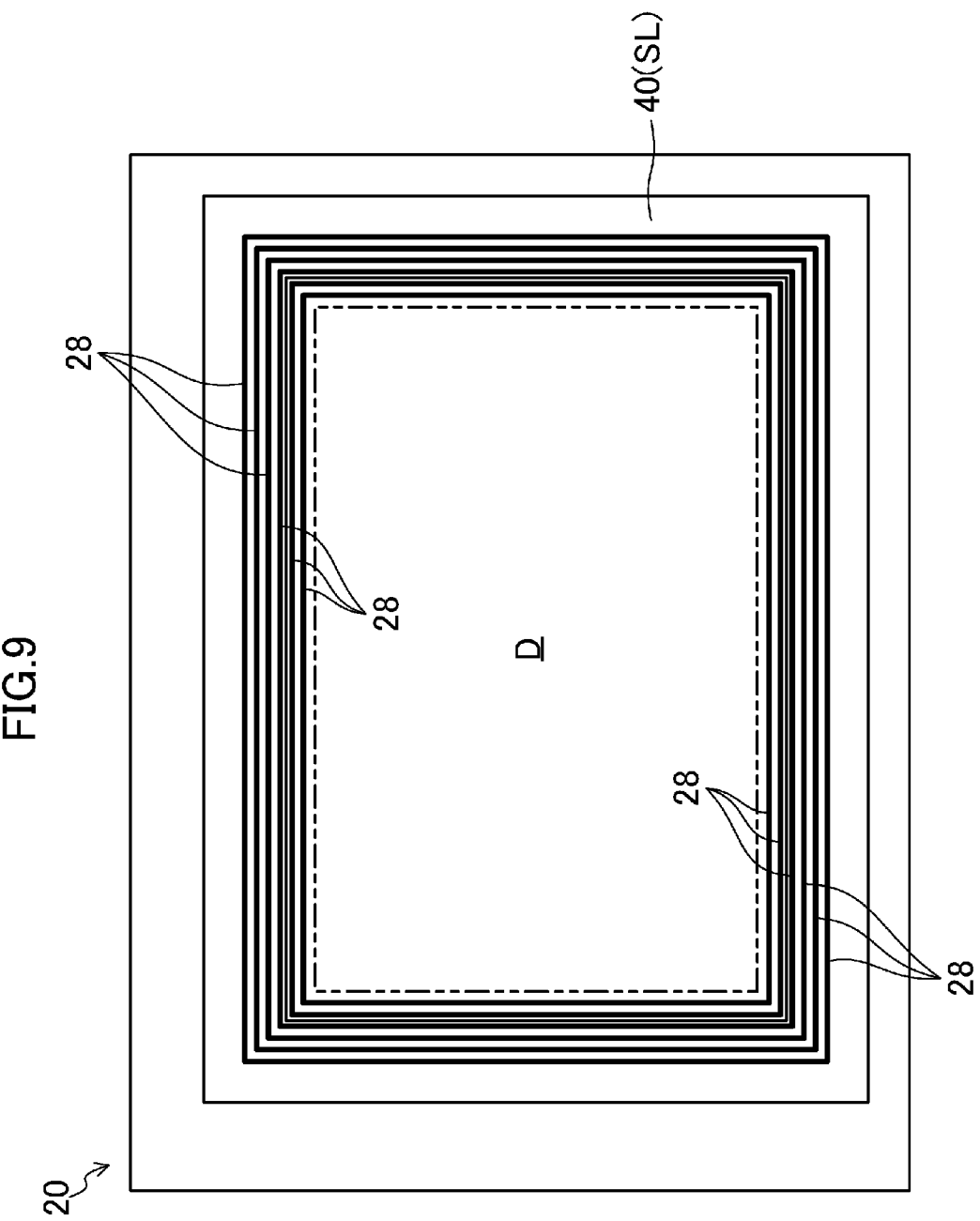
FIG. 9 is a plan view schematically illustrating an array substrate according to a first variation.
Figure 10:
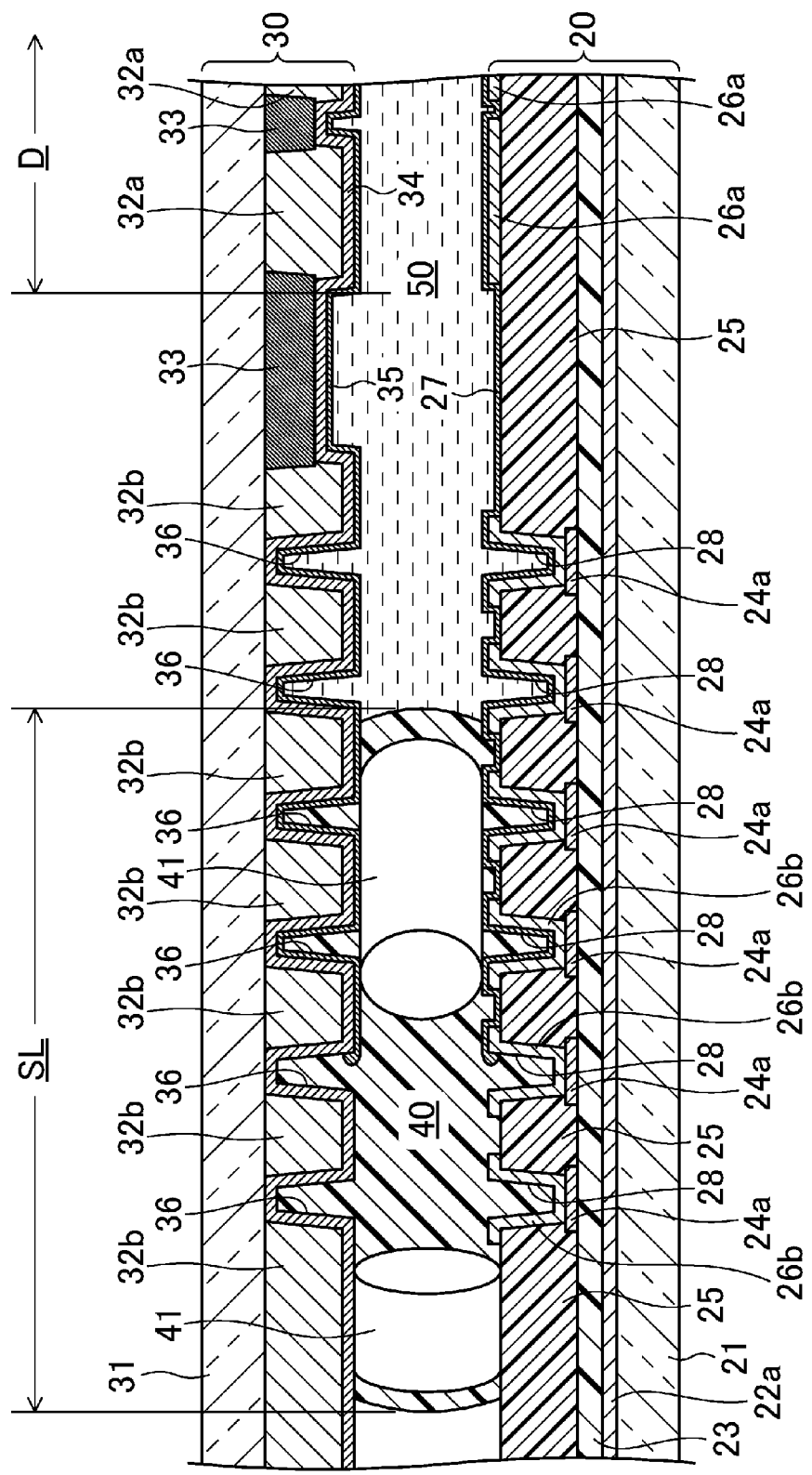
FIG. 10 is a cross-sectional view illustrating a liquid crystal display device according to the first variation.

In the above-described embodiments, it has been described that in the array substrate 20 and the counter substrate 30, all of the plurality of grooves 28, 36 are provided in the seal region SL. However, the embodiments are not limited to this configuration. For example, as shown in a first variation illustrated in FIGS. 9 and 10, the inner two of six grooves 28 may be provided inwardly from the seal region SL. Also in this case, four of the grooves 28 for restricting the outward spread of the alignment film material are provided in the seal region SL. Thus, the width of the picture-frame region F can be reduced.

(Second Variation)

Figure 11:
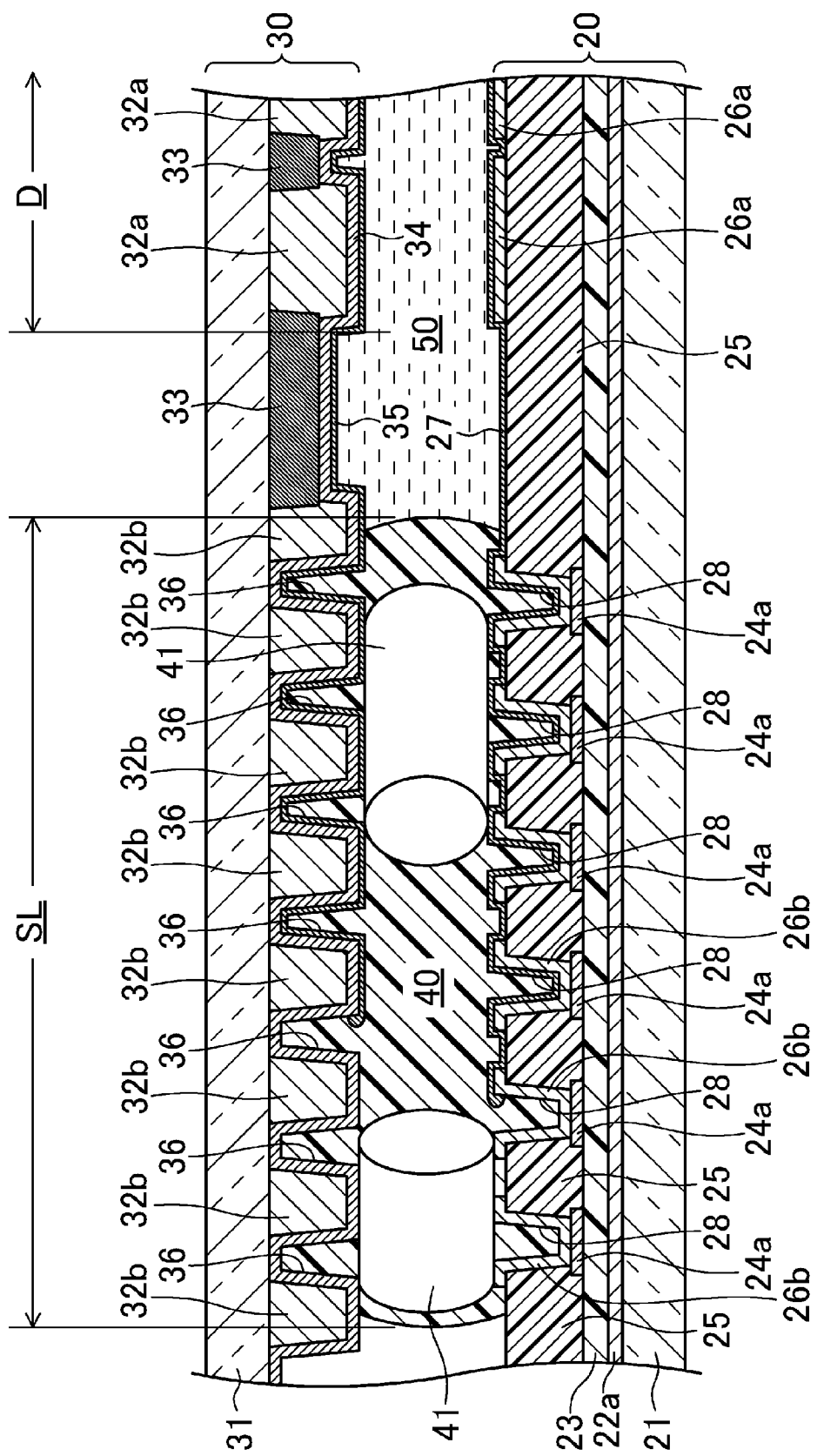
FIG. 11 is a cross-sectional view illustrating a liquid crystal display device according to a second variation.

In the above-described embodiments, it has been described that six grooves are provided in each of the array substrate 20 and the counter substrate 30. However, the number of grooves may be different between the two substrates. For example, as shown in a second variation illustrated in FIG. 11, six grooves 28 may be provided in the array substrate 20, whereas seven grooves 36 may be provided in the counter substrate 30. In this case, positions of the grooves 28 in the array substrate 20 do not correspond on a one-to-one basis to positions of the grooves 38 in the counter substrate 30. However, glass fiber ground products 41 mixed as spacers in the sealing material 40 are sandwiched between the array substrate 20 and the counter substrate 30, so that no problem arises.

(Third Variation)

Figure 12:
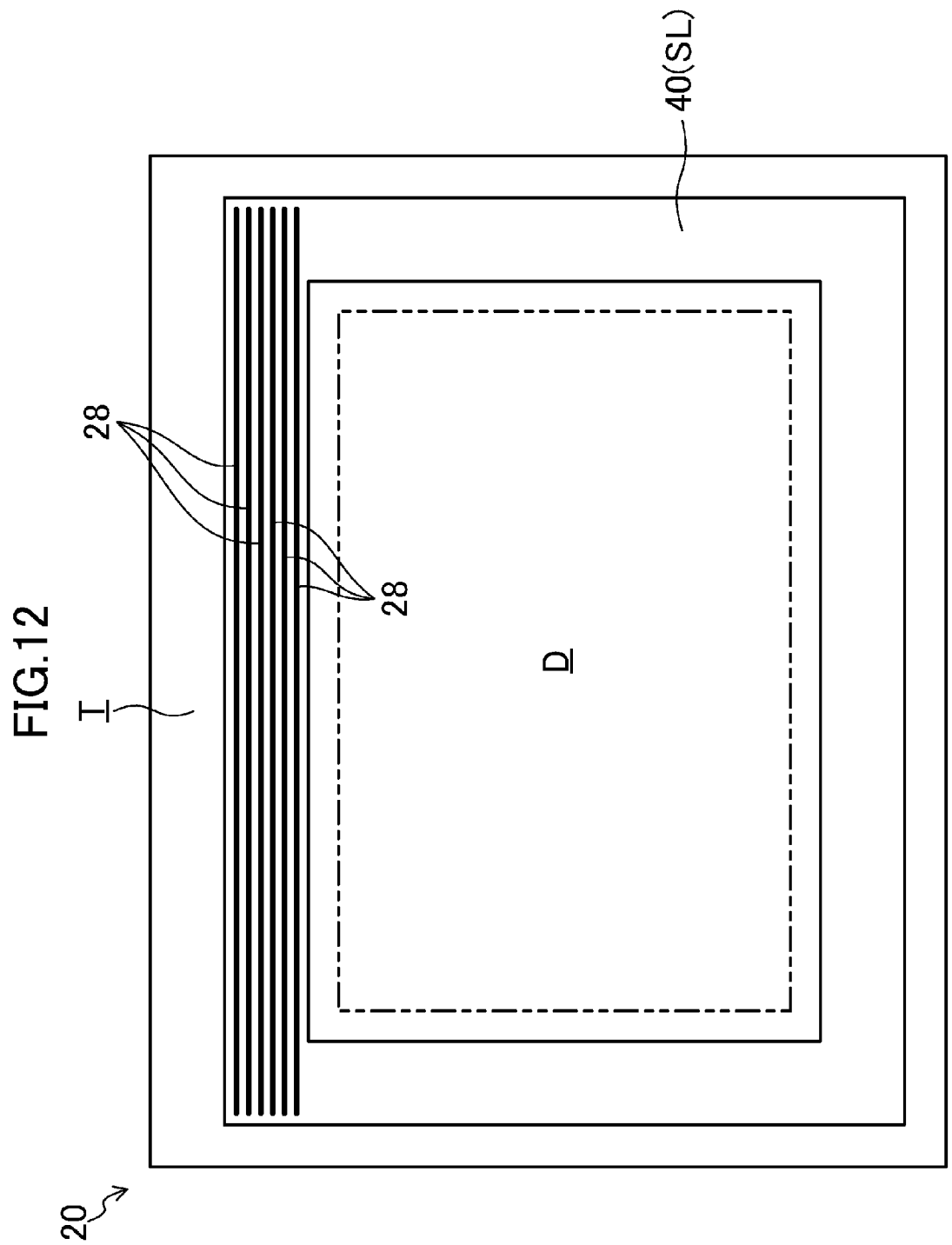
FIG. 12 is a plan view schematically illustrating an array substrate according to a third variation.

In the above-descried embodiments, it has been described that in the array substrate 20 and the counter substrate 30, the grooves 28, 36 are provided in a frame-like shape along the seal region SL. However, the embodiments are not limited to this configuration. For example, the grooves may extend along only one side of the seal region SL. For example, as shown in a third variation illustrated in FIG. 12, when a terminal region T is defined along one side (upper side in FIG. 12) of the array substrate 20, grooves 28 may be provided along the upper side.

(Fourth Variation)

Figure 13:
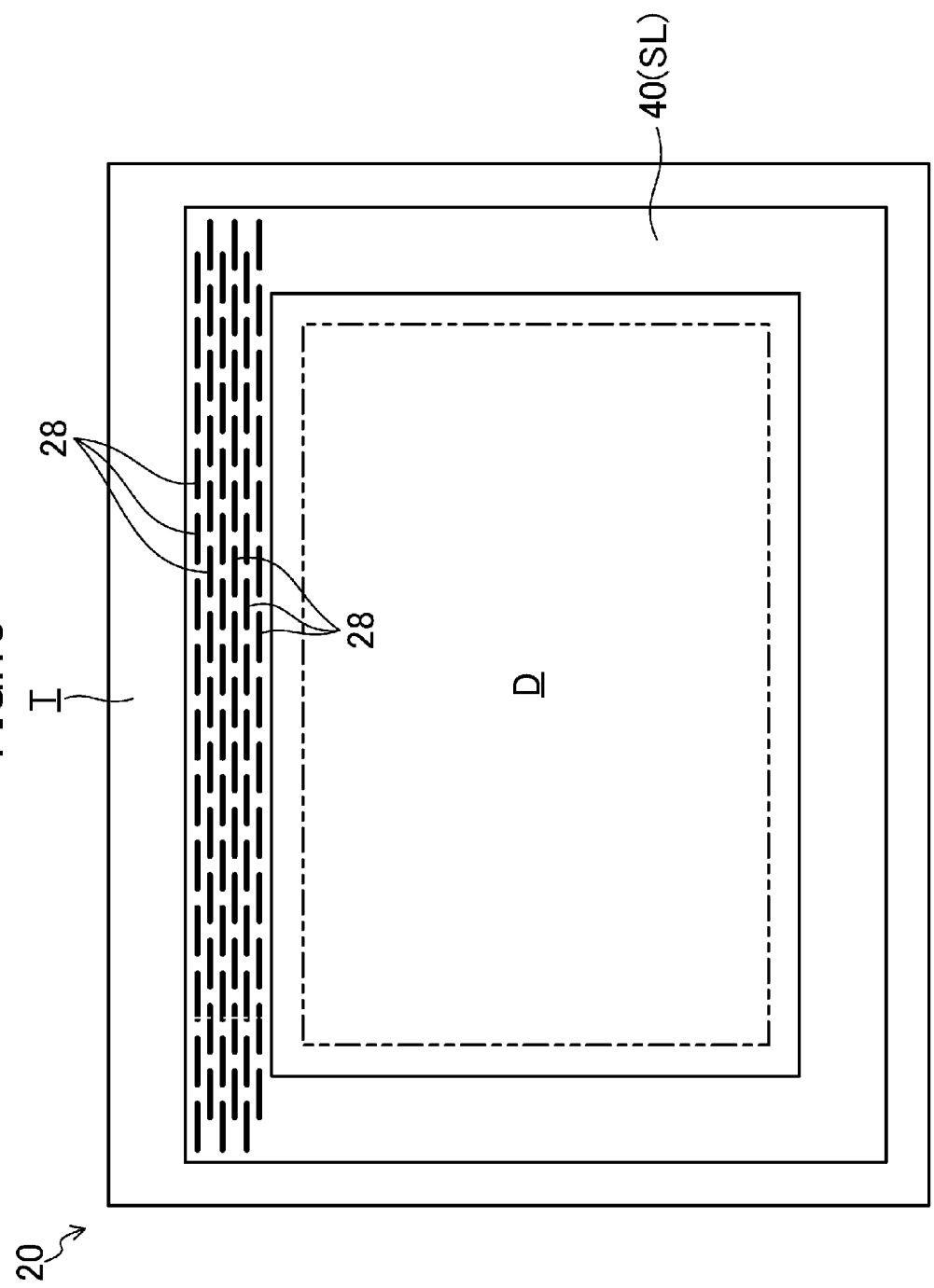
FIG. 13 is a plan view schematically illustrating an array substrate according to a fourth variation.

The grooves 28, 36 may be, but not limited to, such a continuously extending configuration as described in the above-described embodiments. For example, as shown in a fourth variation illustrated in FIG. 13, the grooves 28 may be discontinuously formed in a broken line pattern. In this case, the grooves 28 are formed in a staggered pattern so that adjacent grooves 28 are not adjacent to a region in which no groove is formed. This can enhance the effect of reducing the spread of the alignment film material.

In addition to the above-described embodiment, a silicon layer made of the same material as the semiconductor layer of the thin film transistor may be provided in an island pattern between the gate insulating film 23 and each stopper layer 24a. Even when raised portions are formed on a surface of the gate insulating film 23 due to the interconnects 22a, providing a silicon layer under the stopper layer 24a can further ensure prevention of a leak.

(Fifth Variation)

Figure 14:
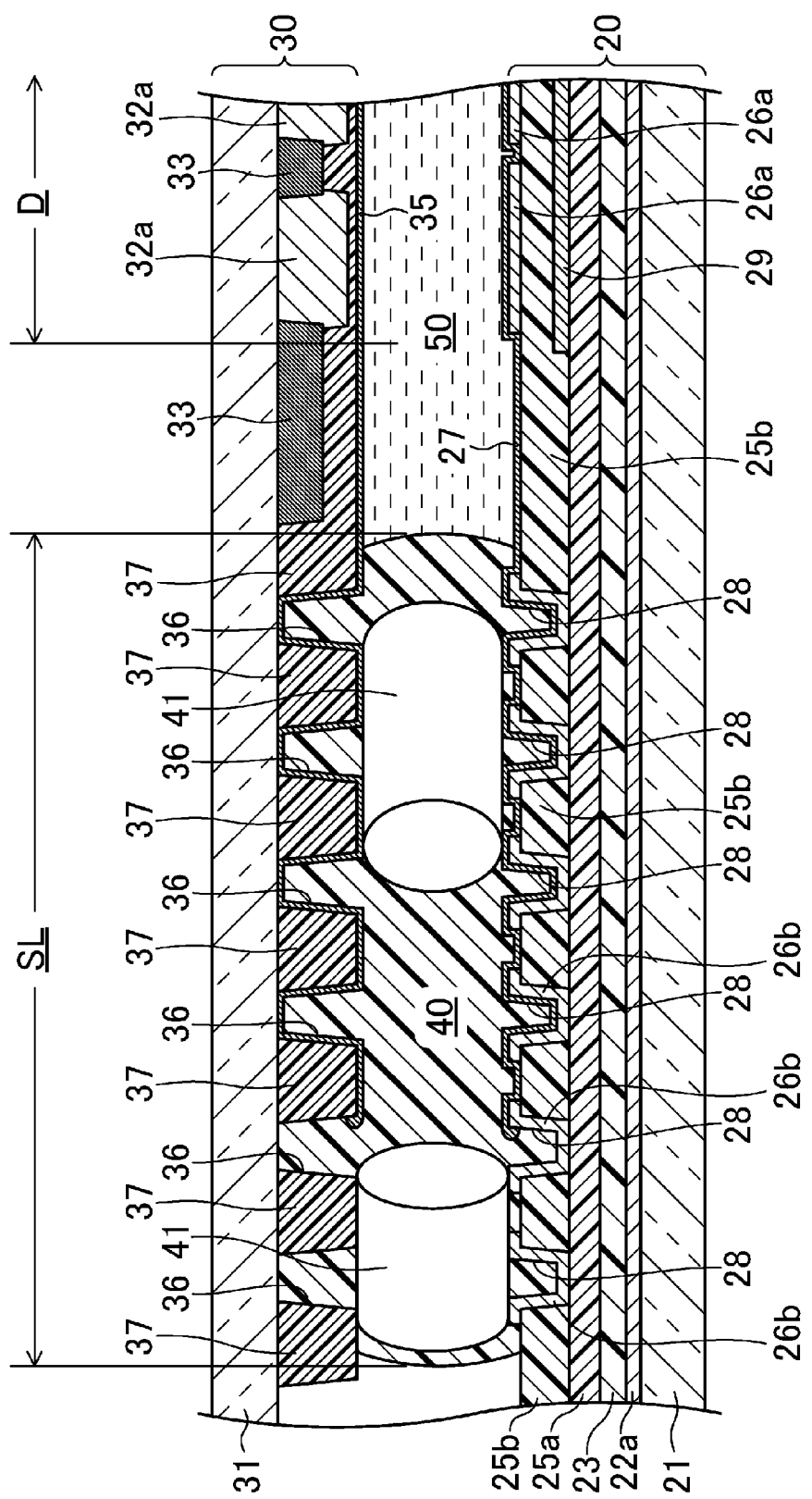
FIG. 14 is a plan view schematically illustrating an array substrate according to a fifth variation.

In the above-described embodiments, it has been described that in forming the grooves 28 in the array substrate 20, the portions of both of the organic insulating film and the inorganic insulating film of the interlayer insulating film 25 are removed to expose the stopper layers 24a or the substrate body 21 at the surfaces of the grooves 28. However, it is sufficient when the portions of at least the organic insulating film of the interlayer insulating film 25 are removed. For example, in the case of the IPS liquid crystal display device 10 in which the first interlayer insulating film 25a is made of an inorganic insulating material such as silicon nitride (SiNx) and the second interlayer insulating film 25b is made of an organic insulating material such as an acrylic resin as in the second embodiment, it is possible to form the grooves 28 only in the second interlayer insulating film 25b by using the first interlayer insulating film 25a as a stopper layer in forming the grooves 28 as shown in a fifth variation illustrated in FIG. 14. In this case, the first interlayer insulating film 25a is used as a stopper layer, so that it is not necessary to form the stopper layers 24a from the second conductive film.

(Other Variations)

In the above-described embodiments, it has been described that the black matrix 33 is provided at the interface between the display region D and the picture-frame region F of the counter substrate 30 so that the interface is shielded against light. However, the interface between the display region D and the picture-frame region F may be shielded against light at the array substrate 20 but not at the counter substrate 30. In this case, for example, the interface can be shielded against light by using the second conductive film.

In the above-described embodiments, it has been described that the grooves 28 and 36 are respectively formed in the array substrate 20 and the counter substrate 30. However, the grooves 28 may be formed in the array substrate 20, whereas no groove may be formed in the counter substrate 30. In this case, a predetermined region of the counter substrate 30 on which a transfer pad, and the like are provided can be irradiated with a laser, or the like to partially remove the alignment film 35, so that the picture-frame region of the counter substrate 30 has a reduced width substantially equal to the width of the picture-frame region of the array substrate 20.

Third Embodiment

Next, a liquid crystal display device 10 of a third embodiment will be described. In the present embodiment, configurations identical with or corresponding to the configurations of the first and second embodiment are labeled with the same reference characters as shown in the first and second embodiments for description.

Similarly to the first embodiment, the liquid crystal display device 10 includes an array substrate 20 and a counter substrate 30 which face each other and are bonded to each other with a sealing material 40 provided at their outer peripheral parts, wherein a liquid crystal layer 50 is provided as a display layer in a space surrounded by the sealing material 40.

Figure 15:
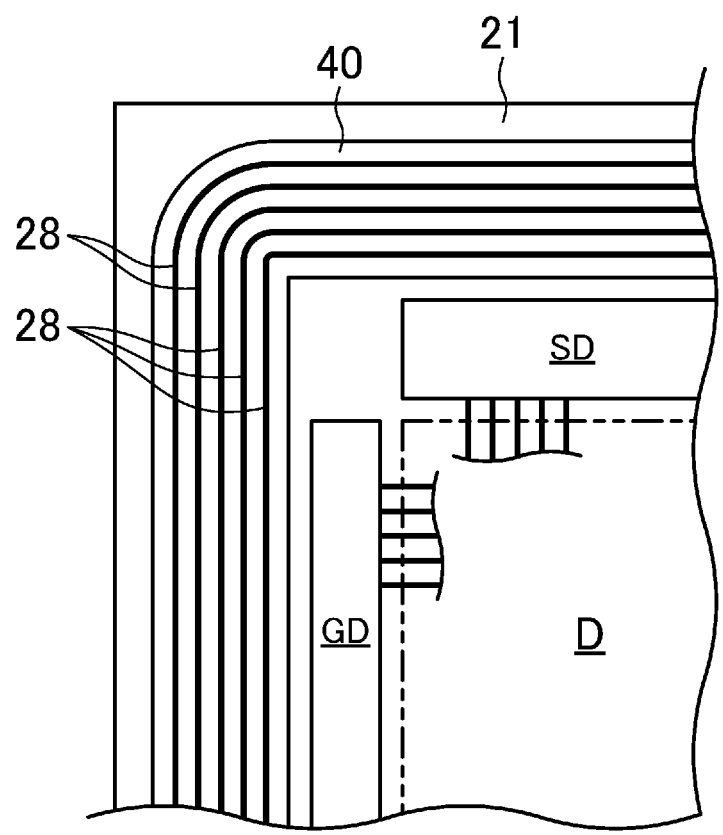
FIG. 15 is a plan view schematically illustrating an array substrate according to a third embodiment.

As illustrated in FIG. 15, the liquid crystal display device 10 is different from that of each of the first and second embodiments in that a gate driver region GD and a source driver region SD are arranged inwardly from a seal region SL. The liquid crystal display device 10 is a fringe field switching (FFS) liquid crystal display including TFTs having a top gate structure. That is, similarly to the second embodiment, a common electrode 29 is formed on the array substrate 20, but not on the counter substrate 30, to have a slit, and pixel electrodes 26a are each provided on the entire surface of a corresponding one of the pixels when viewed in plan.

Figure 16:
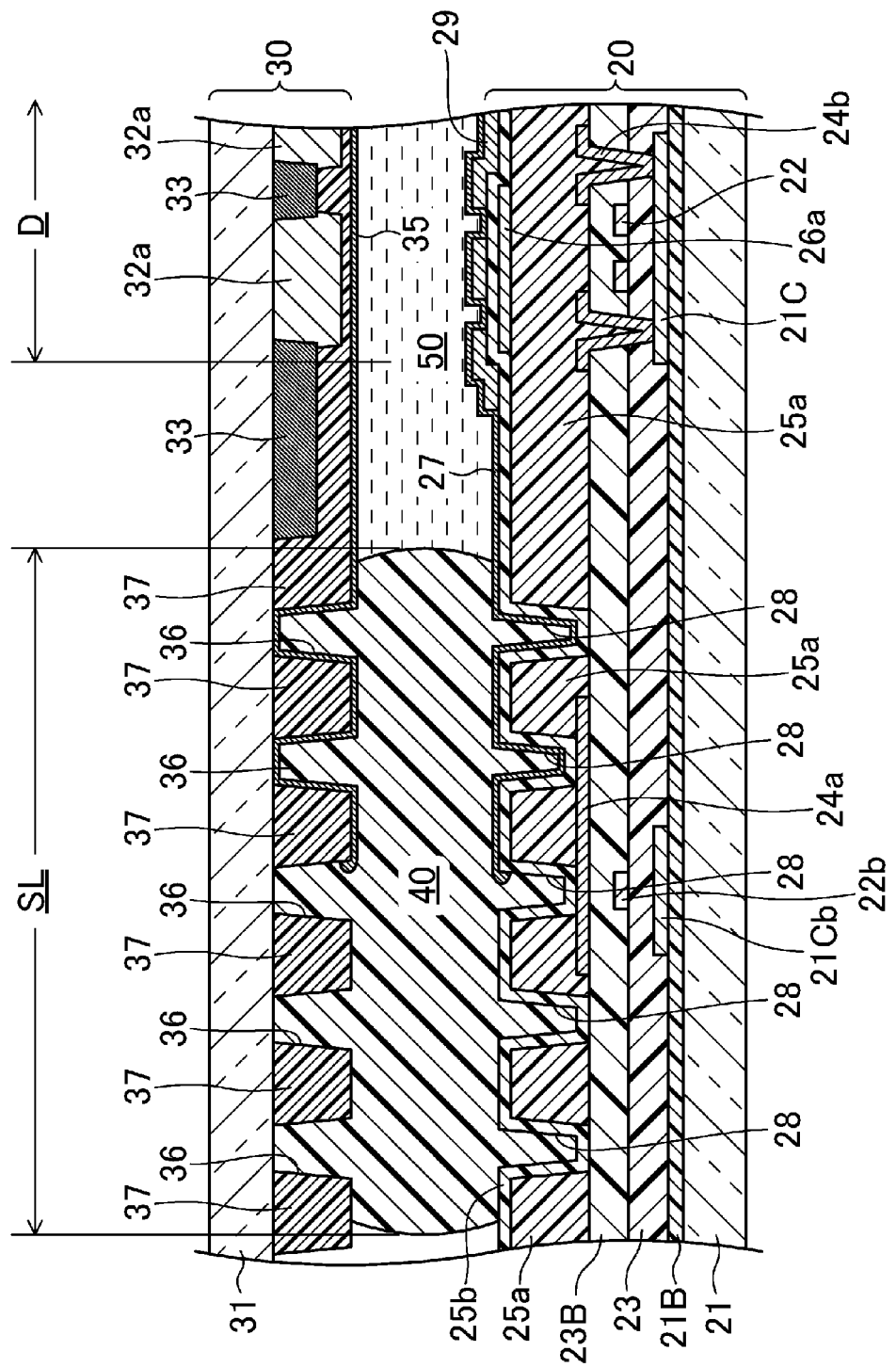
FIG. 16 is a cross-sectional view illustrating a liquid crystal display device according to the third embodiment.

As illustrated in FIG. 16, the array substrate 20 includes a first inorganic insulating film 21B, a semiconductor film 21C, a gate insulating film 23, a first conductive film including gate electrodes 22, a second inorganic insulating film 23B, a second conductive film including interconnect layers 24a and source/drain electrodes 24b, an organic insulating film 25a, a first transparent conductive film including the pixel electrodes 26a, a third inorganic insulating film 25b, a second transparent conductive film provided as a common electrode 29, and an alignment film 27 which are stacked on a substrate body 21. The first inorganic insulating film 21B, the second inorganic insulating film 23B, and the third inorganic insulating film 25b are made of, for example, an inorganic insulating material such as a silicon oxide film ($SiO_2$) or silicon nitride (SiNx). The organic insulating film 25a is made of, for example, an organic insulating material such as an acrylic resin. The semiconductor film 21C, the gate electrode 22, and the source/drain electrodes 24b form the TFT having a top gate structure. For example, a low temperature polysilicon (LTPS) film or a continuous grain silicon (CG silicon) film is used as the semiconductor film 21C.

Grooves 28 are provided in positions from which the organic insulating film 25a has been removed. The third inorganic insulating film 25b covers surfaces of the grooves 28. Some of the grooves 28 located in a region overlapping gate metal 22b and a semiconductor film 21Cb may be provided with the interconnect layers 24a as stopper layers made of the same second conductive film as the source/drain electrodes 24b if necessary. Here, the semiconductor film 21Cb and the gate metal 22b, which the grooves 28 overlap, form part of the gate driver GD. When the organic insulating film 25a is made of a photosensitive acrylic resin, the photosensitive acrylic resin is exposed to light, and then, the organic insulating film 25a is developed, thereby forming the grooves 28. Alternatively, when the organic insulating film 25a is made of a non-photosensitive acrylic resin, a resist is applied to the organic insulating film 25a and is then developed, and the organic insulating film 25a is etched to remove portions of the organic insulating film 25a. A resist is further applied to the organic insulating film 25a and is then developed, and the organic insulating film 25a is etched to remove portions of the organic insulating film 25a, thereby forming the grooves 28. In this case, the second conductive film may be provided as a stopper layer in groove regions so that the insulating film under the organic insulating film is not removed by etching.

The interconnect layers 24a are used as interconnects. Therefore, the interconnect layers 24a may also be provided in regions in which the semiconductor film 21Cb and the gate metal 22b forming part of the gate driver GD are not provided. The surfaces of the grooves 28 may be covered with a first transparent conductive film identical with the pixel electrodes 26a or a second transparent conductive film identical with the common electrode 29. When the surfaces of the grooves 28 are covered with the first transparent conductive film or the second transparent conductive film, and the underlying interconnect layers 24a, or the like are used as interconnects, a design in which a short circuit via the transparent conductive films is not formed between the interconnects is required. For example, a patterning design in which the interconnect layers 24a and the transparent conductive film do not overlap each other or a design in which a second inorganic insulating film 25b, or the like is provided between the interconnect layers 24a and the transparent conductive film is required.

The counter substrate 30 includes a color filter layers 32a, a black matrix 33, an overcoat layer 37, and an alignment film 35 which are stacked on a substrate body 31. Specifically, the overcoat layer 37 is made of, for example, a transparent acrylic resin and is provided on the entire surface of the substrate to cover the color filter layers 32a and the black matrix 33.

Grooves 36 are provided in positions from which the overcoat layer 37 in the picture-frame region F has been removed. The grooves 36 are formed by developing the overcoat layer 37 after exposure of the overcoat layer 37 to light. Alternatively, when the overcoat layer 37 is non-photosensitive, a resist is applied to the overcoat layer 37 and is then developed, and the overcoat layer 37 is further etched to remove portions of the overcoat layer 37.

Other configurations are based on the configuration of a display similar to that of the first embodiment or a generally known IPS liquid crystal display.

In the liquid crystal display device 10 having the above-described configuration, a predetermined voltage is applied on a pixel-by-pixel basis to the liquid crystal layer 50 between each of the pixel electrodes 26a and the common electrode 29 on the array substrate 20 to induce a fringing electric field in a lateral direction, thereby varying the alignment of the liquid crystal layer 50. In this way, the transmittance of light transmitted through the display panel is adjusted, so that a desired image is displayed.

The liquid crystal display device 10 having the above-described configuration can be fabricated by the fabrication method of the first embodiment based on a production method of a conventional IPS liquid crystal display device.

In the liquid crystal display device 10 having the above-described configuration, the source driver region SD and the gate driver region GD are located inwardly from the seal region SL. Thus, circuits provided in the source driver region SD and the gate driver region GD can be in an enclosed space between the array substrate 20 and the counter substrate 30. In the seal region SL, the grooves 28 divide the organic insulating film into an inner portion and an outer portion. This reduces moisture, oxygen, or the like outside the enclosed space entering the enclosed space through the organic insulating film. Thus, the circuits in the pixel region as well as the circuits provided in the source driver region SD and the gate driver region GD can be less susceptible to moisture- or oxygen-caused deterioration.

The liquid crystal display device 10 having the above-described configuration includes no common electrode on the counter substrate 30, so that a surface of the substrate body 31 is exposed in a region in which the alignment film 35 is not provided. Therefore, a sealing material 40 is directly bonded to the substrate body 31, which is a glass substrate. Thus, an increased adhesiveness can be obtained between the counter substrate 30 and the sealing material 40.

Other configurations and advantages are similar to those described in the first embodiment.

(Sixth Variation)

In the third embodiment, it has been described that the FFS liquid crystal display as the liquid crystal display device 10 includes TFTs having a top gate structure. However, as shown in a sixth variation illustrated in FIG. 17, an FFS liquid crystal display may include TFTs having a bottom gate structure.

Figure 17:
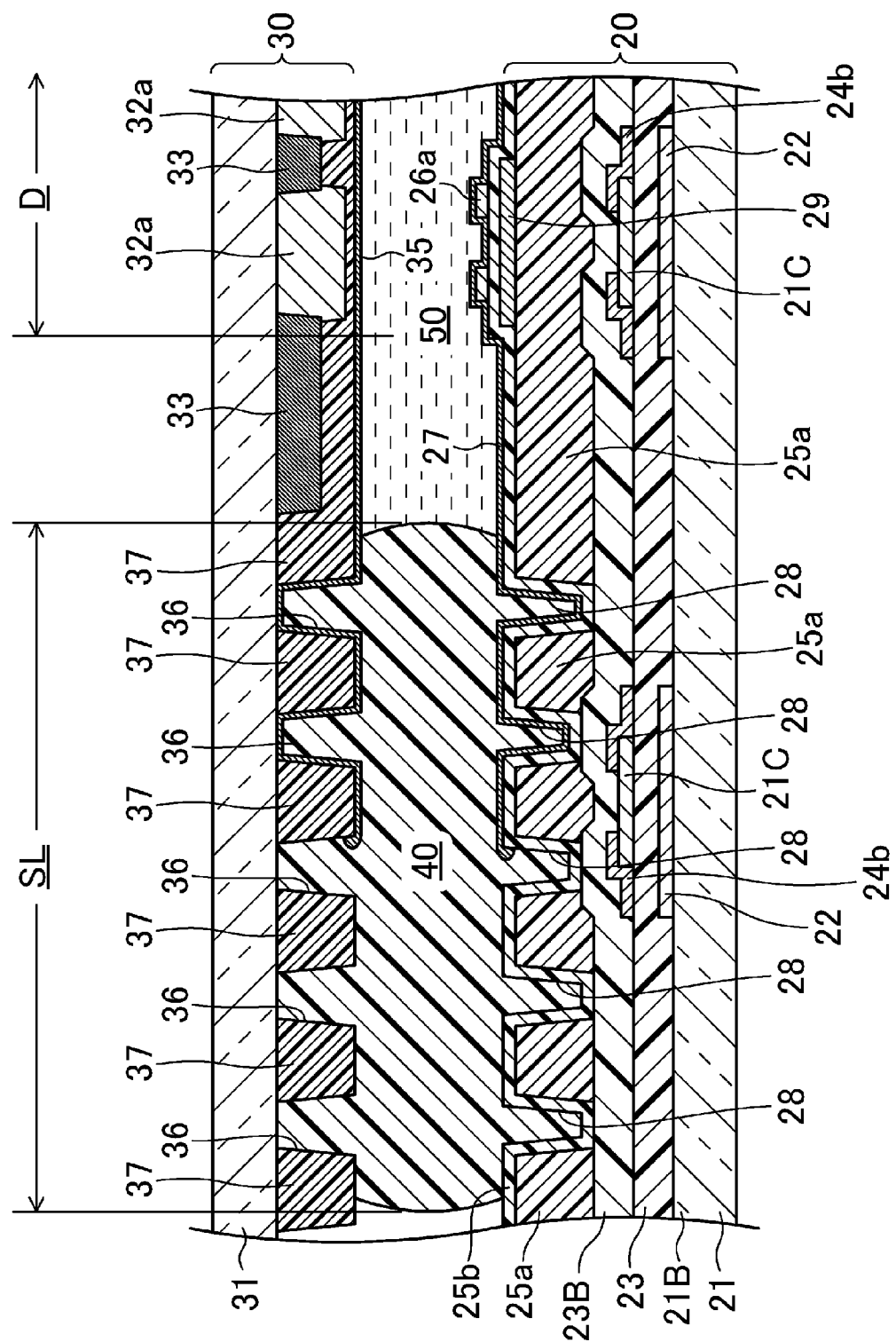
FIG. 17 is a cross-sectional view illustrating a liquid crystal display device according to a sixth variation.

In this case, as illustrated in FIG. 17, an array substrate 20 includes a first conductive film containing gate electrodes 22, a gate insulating film 23, a semiconductor film 21C, a second conductive film including interconnect layers 24a and source/drain electrodes 24b, a first inorganic insulating film 23B, an organic insulating film 25a, a first transparent conductive film provided as a common electrode 29, a second inorganic insulating film 25b, a second transparent conductive film including pixel electrodes 26a, and an alignment film 27 which are stacked on a substrate body 21. The first inorganic insulating film 23B and second inorganic insulating film 25b are made of, for example, an inorganic insulating material such as silicon nitride (SiNx). The organic insulating film 25a is made of, for example, an organic insulating material such as an acrylic resin. The gate electrode 22, the semiconductor film 21C, and the source/drain electrodes 24b form a TFT having a bottom gate structure. For example, an amorphous silicon (a-Si) film, an oxide semiconductor film (e.g., an In—Ga—Zn-based oxide (In—Ga—Zn—O) film), or the like is used as the semiconductor film 21C. As illustrated in FIG. 17, the TFT includes TFTs for pixel drive and TFTs in circuits in the gate driver region GD. The TFTs in the circuits in the gate driver region GD may overlap the grooves 28 as illustrated in FIG. 17 or may be provided not to overlap the grooves 28.

The grooves 28 are provided in positions from which the organic insulating film 25a has been removed. A second inorganic insulating film 25b covers surfaces of the grooves 28. When the organic insulating film 25a is made of a photosensitive acrylic resin, the photosensitive acrylic resin is exposed to light, and then, the organic insulating film 25a is developed, thereby forming the grooves 28. Alternatively, when the organic insulating film 25a is made of a non-photosensitive acrylic resin, a resist is applied to the organic insulating film 25a and is then developed, and the organic insulating film 25a is etched to remove portions of the organic insulating film 25a. A resist is further applied to the organic insulating film 25a and is then developed, and the organic insulating film 25a is etched to remove the portions of the organic insulating film 25a, thereby forming the grooves 28.

The counter substrate 30 and other configurations are similar to those in the third embodiment.

In the liquid crystal display device 10 having the above-described configuration, a predetermined voltage is applied on a pixel-by-pixel basis to the liquid crystal layer 50 between each of the pixel electrodes 26a and the common electrode 29 on the array substrate 20 to induce a fringing electric field in a lateral direction, thereby varying the alignment of the liquid crystal layer 50. In this way, the transmittance of light transmitted through the display panel is adjusted, so that a desired image is displayed.

INDUSTRIAL APPLICABILITY

The present invention is useful for liquid crystal display devices. The present invention is useful, in particular, for a structure to control a region of a picture-frame region of a display panel to which an alignment film is applied.

DESCRIPTION OF REFERENCE CHARACTERS

10 Liquid Crystal Display Device
20 Array Substrate
21 Substrate Body
22a Interconnect (First Interconnect)
23 Gate Insulating Film (First Insulating Film)
24a Stopper Layer (Second Interconnect)
25 Interlayer Insulating Film (Second Insulating Film)
26b Transparent Conductive Film
27 Alignment Film
28 Groove
30 Counter Substrate
32a Color Filter Layer
32b Color Filter Layer
34 Common Electrode
35 Alignment Film
36 Groove
37 Overcoat Layer
40 Sealing Material
50 Liquid Crystal Layer

The invention claimed is:
1. A liquid crystal display device comprising:
an array substrate;
a counter substrate facing the array substrate;
a sealing material which is provided outside a display region and by which the array substrate is bonded to the counter substrate;
a liquid crystal layer in a region surrounded by the sealing material between the array substrate and the counter substrate; and
alignment films each provided on a surface of a corresponding one of the array substrate and the counter substrate facing the liquid crystal layer to cover an area including the display region, wherein
a plurality of grooves are provided in the surface of the array substrate facing the liquid crystal layer to extend along the sealing material, and are spaced apart from each other in a width direction of the sealing material,
each alignment film covers surfaces of some or all of the grooves located from a midway portion of the sealing material in a width direction thereof toward the display region, and is in contact with the sealing material,
a portion of the sealing material located from the midway portion in the width direction in a direction away from the display region is directly in contact with an element made of an inorganic material that is provided on the array substrate without the alignment film being provided between the seal material and the array substrate,
a plurality of grooves are provided in the surface of the counter substrate facing the liquid crystal layer to extend along the sealing material, and are spaced apart from each other in a width direction of the sealing material,
each alignment film covers surfaces of some or all of the grooves in the array substrate and the counter substrate located from the midway portion of the sealing material in the width direction thereof toward the display region, and is in contact with the sealing material,
the portion of the sealing material located from the midway portion in the width direction in a direction away from the display region is directly in contact with the element made of the inorganic material that is provided on the array substrate and the counter substrate without the alignment films being provided between the seal material and the array substrate and between the seal material and the counter substrate,
the counter substrate includes a color filter layer at least in the display region and a region provided with the sealing material, and the grooves in the counter substrate are formed in positions which are located in the region provided with the sealing material and from which portions of the color filter layer are removed by a partial or total thickness of the color filter layer.

2. A liquid crystal display device, comprising:
an array substrate;
a counter substrate facing the array substrate;
a sealing material which is provided outside a display region and by which the array substrate is bonded to the counter substrate;
a liquid crystal layer in a region surrounded by the sealing material between the array substrate and the counter substrate; and
alignment films each provided on a surface of a corresponding one of the array substrate and the counter substrate facing the liquid crystal layer to cover an area including the display region, wherein
a plurality of grooves are provided in the surface of the array substrate facing the liquid crystal layer to extend along the sealing material, and are spaced apart from each other in a width direction of the sealing material,
each alignment film covers surfaces of some or all of the grooves located from a midway portion of the sealing material in a width direction thereof toward the display region, and is in contact with the sealing material,
a portion of the sealing material located from the midway portion in the width direction in a direction away from the display region is directly in contact with an element made of an inorganic material that is provided on the array substrate without the alignment film being provided between the seal material and the array substrate,
a plurality of grooves are provided in the surface of the counter substrate facing the liquid crystal layer to extend along the sealing material, and are spaced apart from each other in a width direction of the sealing material,
each alignment film covers surfaces of some or all of the grooves in the array substrate and the counter substrate located from the midway portion of the sealing material in the width direction thereof toward the display region, and is in contact with the sealing material,
the portion of the sealing material located from the midway portion in the width direction in a direction away from the display region is directly in contact with the element made of the inorganic material that is provided on the array substrate and the counter substrate without the alignment films being provided between the seal material and the array substrate and between the seal material and the counter substrate,
the counter substrate includes an overcoat layer at least in the display region and a region provided with the sealing material, and
the grooves in the counter substrate are formed in positions which are located in the region provided with the sealing material and from which portions of the overcoat layer are removed by a partial or total thickness of the overcoat layer.

3. A liquid crystal display device, comprising:
an array substrate;
a counter substrate facing the array substrate;
a sealing material which is provided outside a display region and by which the array substrate is bonded to the counter substrate;
a liquid crystal layer in a region surrounded by the sealing material between the array substrate and the counter substrate; and
alignment films each provided on a surface of a corresponding one of the array substrate and the counter substrate facing the liquid crystal layer to cover an area including the display region, wherein
a plurality of grooves are provided in the surface of the array substrate facing the liquid crystal layer to extend along the sealing material, and are spaced apart from each other in a width direction of the sealing material,
each alignment film covers surfaces of some or all of the grooves located from a midway portion of the sealing material in a width direction thereof toward the display region, and is in contact with the sealing material,
a portion of the sealing material located from the midway portion in the width direction in a direction away from the display region is directly in contact with an element made of an inorganic material that is provided on the array substrate without the alignment film being provided between the seal material and the array substrate, and
in a region of the array substrate in which a first interconnect, a first insulating film, a second interconnect, and a second insulating film are sequentially stacked and the grooves overlap the first interconnect when viewed in plan, a stopper layer formed in a layer identical with the second interconnect is provided between the first insulating film and the second insulating film.

4. The liquid crystal display device of claim 3, wherein a transparent conductive film is provided on surfaces of the grooves to cover at least the stopper layer.

5. The liquid crystal display device of claim 1, wherein the grooves including two to twenty grooves are arranged in parallel in the array substrate.

6. The liquid crystal display device of claim 2, wherein the grooves including two to twenty grooves are arranged in parallel in the counter substrate.

7. The liquid crystal display device of claim 2, wherein the grooves including two to twenty grooves are arranged in parallel in the array substrate.

8. The liquid crystal display device of claim 3, wherein the grooves including two to twenty grooves are arranged in parallel in the array substrate.

9. The liquid crystal display device of claim 3, wherein the grooves including two to twenty grooves are arranged in parallel in the counter substrate.

* * * * *